United States Patent
Harada et al.

(10) Patent No.: US 6,970,764 B2
(45) Date of Patent: Nov. 29, 2005

(54) MACHINING PROGRAM PRODUCING APPARATUS

(75) Inventors: Toshio Harada, Tokyo (JP); Yutaka Shimizu, Aichi (JP); Kouzou Shima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/507,777

(22) PCT Filed: Dec. 26, 2002

(86) PCT No.: PCT/JP02/13625

§ 371 (c)(1),
(2), (4) Date: Sep. 17, 2004

(87) PCT Pub. No.: WO2004/061537

PCT Pub. Date: Jul. 22, 2004

(65) Prior Publication Data

US 2005/0197723 A1 Sep. 8, 2005

(51) Int. Cl.[7] .............................................. G06F 19/00
(52) U.S. Cl. ........................... 700/181; 700/86; 700/87; 700/88; 700/246; 700/253; 700/264; 717/100; 717/114; 717/117; 717/127; 318/568.1; 318/568.13; 318/568.23
(58) Field of Search ................................ 700/86, 87, 88, 700/181, 246, 253, 264; 318/568.1, 568.13, 318/568.23; 717/100, 114, 117, 127

(56) References Cited

U.S. PATENT DOCUMENTS

| 5,870,306 | A | * | 2/1999 | Harada ........................ 700/169 |
| 5,905,891 | A | * | 5/1999 | Harada et al. ............... 717/146 |
| 6,266,572 | B1 | * | 7/2001 | Yamazaki et al. ............. 700/96 |
| 6,290,571 | B1 | * | 9/2001 | Dilger et al. ................... 451/5 |
| 6,728,657 | B2 | * | 4/2004 | Nakamura .................... 702/178 |
| 6,757,889 | B1 | * | 6/2004 | Ito ................................ 717/112 |
| 6,772,039 | B2 | * | 8/2004 | Kakino et al. ............... 700/160 |
| 6,885,984 | B1 | * | 4/2005 | Suzuki et al. ................. 703/22 |
| 2005/0038624 | A1 | * | 2/2005 | Simakov et al. ............. 702/127 |

FOREIGN PATENT DOCUMENTS

| JP | 361230844 A | * | 10/1986 | ........... B23Q 17/00 |
| JP | 62-226310 A | | 10/1987 | |
| JP | 4-77904 A | | 3/1992 | |
| JP | 405289728 A | * | 11/1993 | ........... G05B 19/405 |
| JP | 11-085256 A | | 3/1999 | |
| JP | 2000-347894 A | | 12/2000 | |
| JP | 2001-242918 A | | 9/2001 | |

* cited by examiner

Primary Examiner—Ramesh Patel
(74) Attorney, Agent, or Firm—Sughrue Mion, PLLC

(57) ABSTRACT

An input data check control portion, which compares input data with a decimal point check target word (step 64, 65) and, issues a warning when the input data is the decimal point check target word and the numerical value data of the input data is not given a decimal point (step 66), is provided. This structure enables the prevention of input mistakes of coordinate data and the like, which are easily made at the time of manual programming of a machining program for an NC machine tool, and also enables said input mistakes to be easily found.

14 Claims, 17 Drawing Sheets

FIG. 3

| INPUT DATA SPECIFI- CATION | DATA WITHOUT "." | | | DATA WITH "." | | |
|---|---|---|---|---|---|---|
| | 10μ COMMAND | 1μ COMMAND | Sub μ COMMAND | 10μ COMMAND | 1μ COMMAND | Sub μ COMMAND |
| DECIMAL POINT NECESSARY | 10μ UNIT | 1μ UNIT | 0.1μ UNIT | | mm UNIT | mm UNIT |
| DECIMAL POINT UNNECESSARY | mm UNIT | mm UNIT | mm UNIT | | mm UNIT | mm UNIT |

FIG. 4

| CONTENTS | LATEST | NEXT LATEST | STILL NEXT LATEST | NEXT OLDEST | OLDEST |
|---|---|---|---|---|---|
| (a) ITEM OMISSION | CTa1 | CTa2 | CTa3 | CTa4 | CTa5 |
| (b) DECIMAL POINT OMISSION | CTb1 | CTb2 | CTb3 | CTb4 | CTb5 |
| (c) POSITION INCORRECTNESS | CTc1 | CTc2 | CTc3 | CTc4 | CTc5 |
| (d) EXCESSIVELY LARGE/ EXCESSIVELY SMALL | CTd1 | CTd2 | CTd3 | CTd4 | CTd5 |

FIG. 12

| FUNCTION | PARAMETER NAME AND SET VALUE | | | | | |
|---|---|---|---|---|---|---|
| | 10μ SYSTEM | | 1μ SYSTEM | | Sub μ SYSTEM | |
| EXCESSIVELY SMALL COMMAND VALUE PREVENTION | PD100SM | 100 | PD010SM | 1000 | PD001SM | 10000 |
| DECIMAL POINT GIVING PREVENTION | PD100DT | 200 | PD010DT | 200 | PD001DT | 200 |
| EXCESSIVELY LARGE COMMAND VALUE PREVENTION | PD100LG | 200 | PD010LG | 200 | PD001LG | 200 |

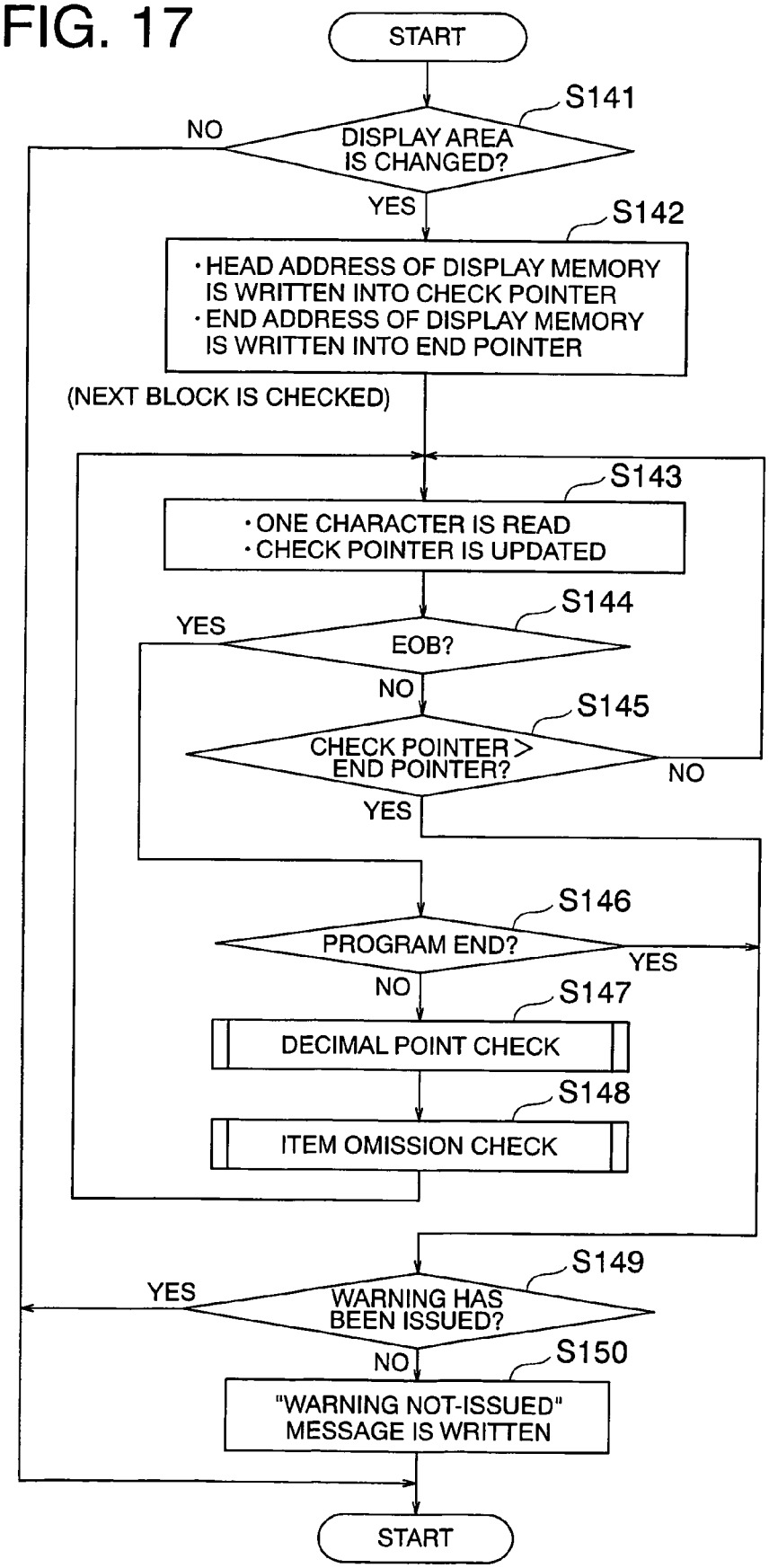

MACHINING PROGRAM PRODUCING APPARATUS

TECHNICAL FIELD

The present invention relates to a program generating apparatus that generates a machining program for controlling a numerical control (herein after abbreviated as "NC") machine tool, and more specifically to a technique with which it is possible to judge the validity of a decimal point input with reference to input data during the key input for a machining program or after the generation of the machining program and, if there is inappropriateness as to the presence or absence of the decimal point input or as to the input data, it is possible to request an operator to make a correction by issuing a notification to him/her.

BACKGROUND ART

When a newly created machining program is executed by an NC machine tool, if command data of the machining program contains mistakes, there occurs a situation where an unexpected movement is made and proper machining becomes impossible due to interference between a tool and a work or a machine. Accordingly, when a machining program is applied to machining for the first time, before actual machining, the program is checked and it is confirmed that no mistakes have been made in a format and a tool path.

Examples of program mistakes that are generally and frequently made during manual programming are a decimal point input omission, a decimal point position mistake, excessive largeness/excessive smallness of an input value, an input omission of an item that should be specified, and the like. These mistakes ascribable to input mistakes are easily made, but it is difficult to visually find them. With a program check method that has conventionally been used in order to find these program mistakes, there are performed a visual check of data and a format of a machining program displayed on a display device attached to an NC device, a syntax check through typical analysis using a decoding means in an NC device, a visual check of whether a desired path is drawn by displaying a tool path, a check of whether a program end point reaches a predetermined position, and the like.

When an operator of an NC machine tool performs a check of every input mistake made during programming with the conventional method, this places a heavy mental load on the operator. Also, in particular, when an operator checks his/her inputted program by himself/herself, it is difficult to completely find program mistakes.

Further, the checks other than the visual check by the operator of the data or the format of the machining program displayed on the display device attached to the NC device are performed after the generation of the machining program is completed and the machining program is analyzed by the NC device. That is, the conventional NC device is not provided with a function of performing an error check by the NC device itself during the generation of the machining program or performing an error check before the completed machining program is analyzed.

It should be noted here that although slightly differing from the problems described above, a technique of solving similar problems is disclosed in JP 62-226310 A. In this patent document, there is disclosed a technique with which it is checked whether an error (omission of data, simultaneous setting, inversion of the upper limit and the lower limit of a limit value, or too-much-close state) is contained in data setting contents for regulating a profiling operation method and an operation range in profiling control, and a message corresponding to the error detected as a result of this check is displayed. With this technique, however, the validity of an input value itself, that is, whether the input value estranges from a value that should be originally commanded is not checked.

Further, JP 11-85256 A discloses a technique with which the kinds, the numbers of times of occurrence, the occurrence dates and times, the occurrence screens, and the occurrence console modes of error messages issued at the time of operation mistakes are displayed through the monitoring and control of a power system performed using a console and a CRT screen of a computer system, thereby allowing an operator to grasp the tendency of operation mistakes to be made by human beings and to prevent the operation mistakes. However, the contents of this technique relate to the monitoring and control of the power system and does not relate to a machining program generating apparatus to which the present invention relates. In addition, with this technique, there are not performed the displaying of caution messages concerning errors in the descending order of the numbers of times of occurrence of warnings and the graphical displaying of the numbers of times of occurrence of the warnings.

DISCLOSURE OF THE INVENTION

The present invention has been made by focusing attention on the conventional problems and has an object of providing a machining program generating apparatus that is capable of alleviating a load placed on an operator who creates a machining program for numerical control.

Further, the present invention has another object of providing a machining program generating apparatus that is capable of achieving an improvement in the quality of programming and motivating an operator to improve his/her programming skill.

The present invention has been made to achieve the objects described above. The present invention provides a machining program generating apparatus for generating a machining program for numerical control, including: an input portion for inputting machining program data; a data display portion for displaying the data inputted from the input portion; a decimal point check target word storage portion for storing a decimal point check target word; and an input data check control portion for comparing the input data with the decimal point check target word and, if the input data is the decimal point check target word and no decimal point is given to numerical value data of the input data, issuing a warning.

With this construction, it becomes possible to prevent a decimal point input omission at the time of programming, to reduce the time for a program check as to the decimal point input omission, and to improve the efficiency of generation of a machining program.

Further, there is provided a machining program generating apparatus for generating a machining program for numerical control, including: an input portion for inputting machining program data; a data display portion for displaying the data inputted from the input portion; a decimal point check target word storage portion for storing a decimal point check target word; a warning judgment value storage unit for storing a predetermined warning judgment value; and an input data check control portion for comparing the input data with the decimal point check target word and, if the input data is the decimal point check target word, comparing numerical value data of the input data with the warning judgment value and, if the numerical value data of the input data is larger or smaller than the warning judgment value, issuing a warning.

Further, there is provided a machining program generating apparatus for generating a machining program for numerical control, including: an input portion for inputting machining program data; a data display portion for displaying the data inputted from the input portion; a decimal point check target word storage portion for storing a decimal point check target word; a decimal point input specification storage portion for storing whether the apparatus adopts a specification where if the input data is not given a decimal point, the data is to be dealt with as data in a minimum command unit; a warning judgment value storage unit for storing a warning judgment value corresponding to the apparatus specification where if the input data is not given a decimal point, the data is to be dealt with as data in the minimum command unit and a warning judgment value under an apparatus specification where if the input data is not given a decimal point, the data is to be dealt with as data in a mm unit; and an input data check control portion for comparing the input data with the decimal point check target word and, if the input data is the decimal point check target word, comparing numerical value data of the input data with the warning judgment value corresponding to the specification and stored in the warning judgment value storage portion, and if the numerical value data of the inputted data is larger or smaller than the warning judgment value, issuing a warning.

Further, in the machining program generating apparatus, the warning judgment value is a reference value for checking a value that makes the input data as an unnatural input value.

With this construction, it becomes possible to prevent the input of an invalid numerical value at the time of programming and to shorten the time for performing a program check, which improves the efficiency of generation of a machining program. Also, even if warning judgment values for apparatuses under different specifications are stored as the warning judgment value, it becomes possible to perform an input data check using a warning judgment value corresponding to the specification of a target apparatus, which makes it possible to prevent misjudgment at the time of an input data check.

Further, there is provided a machining program generating apparatus for generating a machining program for numerical control, including: an input portion for inputting machining program data; a data display portion for displaying the data inputted from the input portion; a G code supporting indispensable input item storage portion for storing indispensable input items constituting a G command; and an input data check control portion for comparing the input data with the indispensable input items constituting the G command and, if any of the indispensable input items are omitted in the input data, issuing a warning.

With this construction, it becomes possible to discriminate/solve an input omission of an indispensable command item with ease even if a machining program is not executed. As a result, it becomes possible to shorten the time required to perform a program check and correction, which improves the efficiency of generation of a machining program.

Further, in the machining program generating apparatus, the input data check control portion performs the comparison each time data input is performed.

With this construction, a program check can be performed each time a data input is performed, so that it is possible to immediately make a correction when a data input mistake is made.

Further, in the machining program generating apparatus, the input data check control portion performs the comparison in a batch manner after the generation of the machining program through the inputting of the data and before analysis of the machining program.

With this construction, unlike in the case of a sequential check, program checks such as a decimal point input omission check are collectively performed without being disturbed by a warning notification issued each time an input operation is performed, so that the efficiency of generation of a machining program is improved.

Further, the machining program generating apparatus further includes a warning message storage portion for storing a warning message, and in the machining program generating apparatus, the warning message stored in the warning message storage portion is displayed on the data display portion.

Further, the machining program generating apparatus further includes: a history counter for, when warnings are detected as a result of the input data check, recording numbers of times of occurrence of the warnings in accordance with the contents of the warnings for each of at least one programming operation; and a caution message storage portion for storing caution messages, and in the machining program generating apparatus, the caution messages for urging cautions in performing programming are displayed on the data display portion in a descending order of the numbers of times of occurrence of the warnings based on the contents lastly recorded in the history counter.

With this construction, it becomes possible for an operator to recognize cautions in performing programming, which contributes to the suppression of simple input mistakes. As a result, the efficiency of generation of a machining program is improved.

Further, the machining program generating apparatus further includes: a history counter for, when warnings are detected as a result of the input data check, recording numbers of times of occurrence of the warnings in accordance with the contents of the warnings independently of at least one programming operation; and a history message storage portion for storing a history message, and in the machining program generating apparatus, prior to programming, the numbers of times of occurrence of the warnings at the time of previous programming operations are graphically displayed on the data display portion in a time-series manner through analysis of the contents recorded in the history counter, and the history message is also displayed.

With this construction, it becomes possible for an operator to objectively recognize his/her current proficiency in the programming technique and to be motivated, which contributes to the suppression of simple input mistakes. As a result, the efficiency of generation of a machining program is improved.

BRIEF DESCRIPTION OF THE DRAWINGS

FIG. 3 is an interpretation correspondence table among decimal point input specifications, minimum command units, and input data according to the first embodiment of the present invention.

FIG. 4 shows an example of a construction of a history counter according to the first embodiment of the present invention.

FIG. 12 shows examples of warning judgment values according to the first embodiment of the present invention.

BEST MODE FOR CARRYING OUT THE INVENTION

First Embodiment

A first embodiment of the present invention will now be described with reference to FIGS. 1 to 17.

Figure 1:
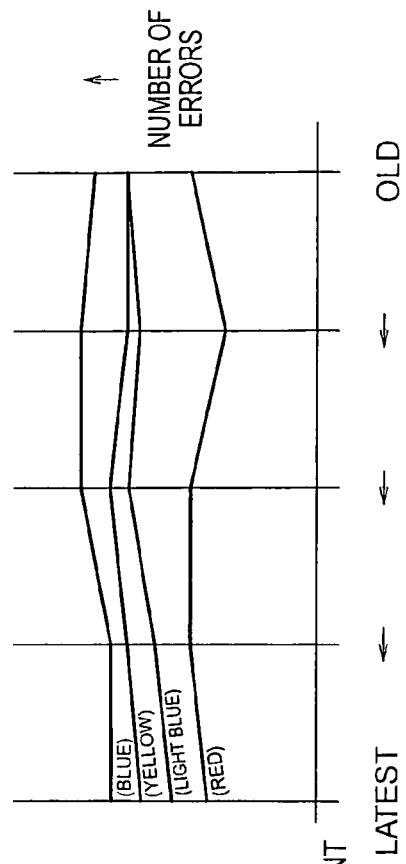
FIG. 1 shows an example of warning history displaying according to a first embodiment of the present invention.

FIG. 1 shows an example of screen displaying of a warning history, in which based on an analysis result of contents of warnings issued at the time of previous machining program input operations by an operator who intends to generate a machining program hereafter, cautions to be observed by the operator in his/her inputting the program as well as the contents of the warnings and the number of times of the warnings issued during previous multiple programming operations performed by him/her are graphically displayed in a time-series manner. It should be noted here that these messages are stored in a caution message table 46 and a history message table 47 to be described later.

In this first embodiment, a warning message is displayed when a data input mistake is made during programming. As to the warning message, four kinds of warning messages, "REQUIRED DATA IS OMITTED", "IS DECIMAL POINT OMITTED?", "DECIMAL POINT MAKES INPUT VALUE EXCESSIVELY LARGE", and "INPUT VALUE IS ABNORMAL IF DECIMAL POINT IS NOT GIVEN", are prepared in advance so as to correspond to the contents of input mistakes, and these warning messages are stored in a warning message table 45 to be described later.

Next, a construction and processing contents of an NC device for performing the displaying shown in FIG. 1 will be described.

Figure 2:
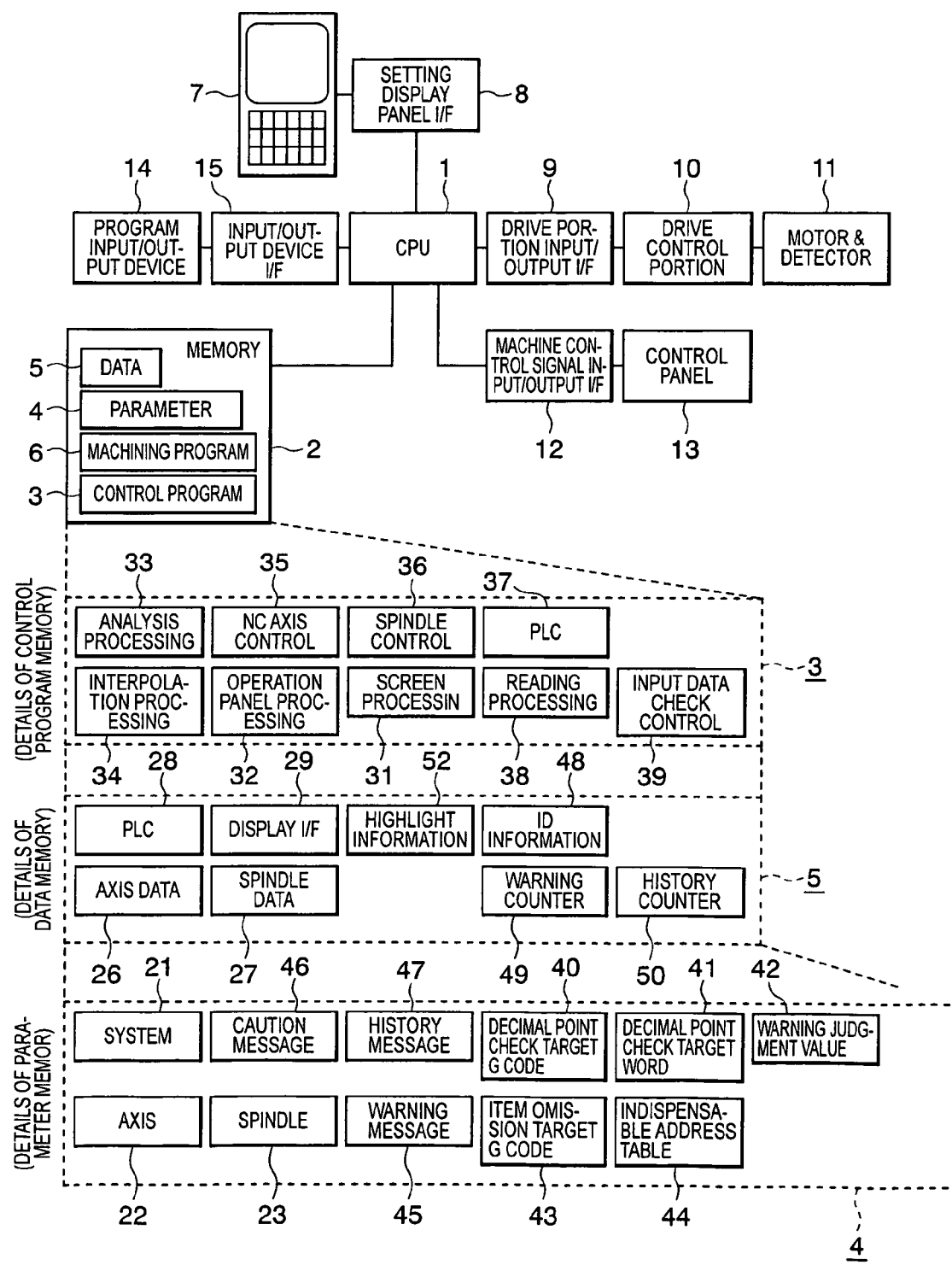
FIG. 2 is a block diagram of an NC device according to the first embodiment of the present invention.

FIG. 2 is a block diagram showing an example of the construction of the NC device described above. In FIG. 2, a CPU 1 is connected to a memory 2, reads a control program stored in a control program area 3 of the memory 2 one step at a time, performs analysis/execution using parameters stored in a parameter area 4 of the memory 2 and various kinds of data stored in a data area 5, and achieves a predetermined function of the NC device. Also, a machining program is stored in a machining program area 6 of this memory 2. A setting display panel 7 for inputting/outputting various kinds of data, which serves as an input portion and a data display portion is connected to the CPU 1 through a setting display panel interface (hereinafter abbreviated as "I/F") 8.

Further, a drive control portion 10 is connected to the CPU 1 through a drive portion input/output I/F 9. The drive control portion 10 supplies drive power to a motor 11 for machine driving and also performs control by internally using feedback information from a detector provided for the motor 11. Note that the feedback information is also written by the CPU 1 into the data area 5 of the memory 2. Further, a machine control signal input/output I/F 12 is connected to the CPU 1, through which lamps and relays on a control panel 13 are driven and signals from various switches are taken in and written into the data area 5 of the memory 2. A program input/output device 14 is also connected to the CPU 1 via an input/output device I/F 15.

The details of the memory 2 are developed and shown below the memory 2 in FIG. 2, in which the memory 2 is divided into the control program area 3, the parameter area 4, the data area 5, and the machining program area 6.

In the parameter area 4, for instance, a system parameter 21, a axis parameter 22, a spindle parameter 23, and the like are stored. In this area, there are further contained various tables necessary in this first embodiment that are a decimal point check target G code table 40, a decimal point check target word table (decimal point check target word storage portion) 41, a warning judgment value table (warning judgment value storage portion) 42, an item omission target G code table 43, a G code supporting indispensable address table (G code supporting indispensable input item storage portion) 44, a warning message table (warning message storage portion) 45, a caution message table (caution message storage portion) 46, and a history message table (history message storage portion) 47. Note that the caution message table 46 is a table that stores messages to be displayed in the upper half of the screen in FIG. 1 and the history message table 47 is a table that stores messages to be displayed in the lower half of the screen in FIG. 1. Also, the warning message table 45 is a table that stores the warning messages described above ("REQUIRED DATA IS OMITTED", "IS DECIMAL POINT OMITTED?", "DECIMAL POINT MAKES INPUT VALUE EXCESSIVELY LARGE", and "INPUT VALUE IS ABNORMAL IF DECIMAL POINT IS NOT GIVEN").

In the system parameter 21 area (decimal point input specification storage portion), there are set a minimum command unit flag (flag showing to which one of command units "10 $\mu$, 1 $\mu$, Sub $\mu$" shown in FIG. 3 the NC device is set), a mm processing flag–and the like. The mm processing flag is a flag showing under which one of the NC data input specifications shown in FIG. 3 the NC device is set, where there are a "decimal point required" type in which in order to interpret an input command value (25, for instance) as "25 mm", it is required to input this value as "25." with a decimal point (for instance, in a 1 μm unit, if a decimal point is not given, this value is interpreted as "25" μm), and a "decimal point unnecessary" type in which it is sufficient that the value "25" is inputted as it is (if no decimal point is given, the value is automatically regarded as a value in the mm unit).

In the data area 5 of the memory 2, for instance, there are stored axis data 26, spindle data 27, a PLC (programmable logic controller) data 28, display I/F data 29, and the like and there are further contained various kinds of data necessary in this first embodiment such as ID information 48, a warning counter 49, a history counter 50, and highlight information 52.

Further, in the control program area 3 of the memory 2, there are stored a screen processing portion 31 for performing screen displaying on the setting display panel 7, an operation panel processing portion 32 for reading keyboard signals of the setting display panel 7 and performing processing in accordance with the read signals, an analysis processing portion 33 for analyzing various commands for NC commanded in a machining program, an interpolation processing portion 34 for generating a predetermined straight-line or circular path based on data of a straight line command or a circular command commanded in the machining program, an NC axis control portion 35 for performing conversion into a movement distance of each axis per unit time based on the interpolation data, a spindle control portion 36 for generating a spindle control signal based on a spindle command commanded in the machining program, a PLC program 37 for controlling various operations of the machining tool, a reading processing portion 38 for reading various programs by controlling the program input/output device 14, and the like. Further, the control program area 3 stores an input data check control portion 39 of this first embodiment.

Next, an operation of the NC device having the construction shown in FIG. 2 will be described.

The CPU 1 is capable of performing a manual operation, an automatic operation, and the like by reading one step at a time the control program, which is stored in the control program area 3 of the memory 2 and is software for realizing various functions such as the manual operation, the automatic operation, and the like of the NC device, and executing the read control program. At this time, the control of a tool path and the input/output into/from the setting display panel 7 are performed with reference to various parameters determined and set in accordance with the specification of a machine system and various kinds of data showing a machine position and the like. The machining program is inputted by operating a keyboard of the setting display panel 7. Alternatively, the machining program was created outside and is recorded on a recording medium such as a floppy disk. In this case, the recording medium is set in the program input/output apparatus 14 and the program is read through the input/output device I/F 15 under control by the read processing unit 38. In either case, the program is stored in the memory 2 through the CPU 1.

The machining program is read one block at a time through automatic operation processing by the control program. Then, the analysis processing portion 33 analyzes the read NC command and creates the axis data 26 and the spindle data 27 composed of a command position, a machine position, and the like for each control axis with reference to values set in the system parameter 21 that determines the specification of the NC device and the specification of a common portion of the machine, the axis parameter 22 that determines the stroke of each control axis and the specification of a limit speed and the like, the spindle parameter 23 that determines the specification of the spindle for grabbing and rotating a work or a tool, and the like.

The interpolation processing portion 34 performs calculation with reference to an output result of the analysis processing portion 33. In the case of a G01 command, the interpolation processing portion 34 calculates a movement amount for each axis per control unit time in the NC device so as to realize a movement on a straight line from a current position to a commanded position based on the commanded position and a commanded speed specified by coordinate values on X, Y, and Z axes. In the case of a G02 or G03 command, the interpolation processing portion 34 calculates a movement amount for each axis per control unit time in the NC device so as to realize a movement at a commanded speed on a circle having a curvature whose center exists at a point specified with coordinate values on I, J, and K axes from the current position to the commanded position on the X, Y, and Z axes. Then, the interpolation processing unit 34 stores the calculated movement amount at an address (memory address) corresponding to each axis in the data 26 area.

The NC axis control portion 35 performs acceleration/deceleration processing and the like based on the interpolation data calculated by the interpolation processing portion 34 and outputs the movement amount of each axis at every moment to the drive control portion 10 through the drive portion input/output I/F 9.

The drive control portion 10 amplifies/converts the axis movement amount to drive power of the motor 11 and drives the motor 11 to a desired rotation angle. Here, the angle data, by which the rotation drive is performed, is fed back to the drive control portion 10 as a detector output and constitutes a closed loop. Also, a difference between the commanded position and the machine position is detected and is converted into drive signal/power as a position error signal. Further, this feedback signal is inputted/updated in the axis data 26 area through the drive portion input/output I/F 9.

In the case of a spindle command for rotationally driving the tool or the work, in the machining program, the number of rotations is commanded after the G01 command (straight line command), the G02 command (clockwise circular command) or the G03 command (counter clockwise circular command) and a position command (coordinate value) and an address "S" showing the spindle. Like in the case of the control axis, this spindle command is inputted from the analysis processing portion 33 into the spindle control portion 36, which then inputs a rotation number signal into the spindle drive control portion 10 through the spindle drive portion input/output I/F 9. The spindle drive control portion 10 amplifies/converts the spindle rotation number into drive power for the motor 11 and the motor 11 is driven at a desired number of rotations. Here, the rotation data, with which rotation drive is performed, constitutes a closed loop through feedback to the spindle drive control portion 10 as a detector output, rotationally drives the spindle at a commanded number of rotations, and rotationally drives the tool or the work grabbed by the spindle.

The PLC program 37 is software that executes the relay sequence and the like of the machine tool and cooperates with an auxiliary command, a tool command, and the like issued from the machining program, thereby performing turning on/off control of an indicator of a heavy current circuit provided on the control panel, a not-shown machine operation panel, and the like and reading processing of a switch signal through the machine control signal input/output I/F 12.

A general NC device is controlled in the manner described above and carries out machining commanded by the machining program.

Next, characteristic operations of this first embodiment will be described.

The input data check control portion 39 in the control program displays an ID information input request screen on the setting display panel 7, and in order to identify the operator who is attempting to operate the NC device, requests him/her to input his/her ID information 48. Then, the input data check control portion 39 checks whether the inputted ID information 48 is registered in the ID information 48 area in the data area 5. If the ID information is not yet registered, it is newly registered. If the information is already registered, an analysis result of operation mistakes made by the operator during previous programming operations shown in FIG. 1 is displayed on the setting display panel 7.

The decimal point check G code table 40 in the parameter area 4 is a G code collection where G commands (G00, G01, G02, G03, . . . ) are collected which each contain an address word (hereinafter simply referred to as the "address" or "word" in some cases) that is capable of using a decimal point. Searching of the table is performed using an arbitrary G code as a key and, if a matching code exists, it is judged that there is a possibility that a decimal point valid address may be commanded in the G command.

The decimal point check target word table 41 is provided for each G code registered in the decimal point check G code table 40 and is a collection of addresses that are each capable of using a decimal point in the G command. Searching of the table is performed using an arbitrary address as a key and, if a matching result is obtained, it is judged that the address is a decimal point valid address.

The warning judgment value table 42 is a table of parameters storing values for judging that it is required to confirm whether an inputted numerical value is appropriate or inappropriate. With the values, for instance, it is judged that a numerical value commanded at an arbitrary address in an arbitrary G command does not exceed a maximum/minimum command value (value not supported by the system of the NC device) provided from the system side of the NC device but is excessively small/excessively large as a value ordinarily commanded in consideration of the size of a machining table and a work to be machined.

Further, the item omission target G code table 43 is a collection of G codes (such as G02 and G03) for which it is required to monitor items that are currently inputted because an error will occur if any item input omission is made to a currently inputted G command.

The indispensable address table 44 stores a group of G command indispensable addresses (I, J, I of G02 and G03 in the case of center specification, and R and the like of G02 and G03 in the case of radius specification) for each G code registered in the item omission target G code table 43. It is judged whether any address is omitted by comparing input data with the table 44.

If an input value is judged as abnormal as a result of an input data check, the warning message described above stored in the warning message table 45 is displayed in accordance with its contents, thereby requesting the operator to confirm whether the numerical value is appropriate or inappropriate and to perform a correction input. Then, the contents of the warning counter 49 corresponding to the warning contents in the data area 5 are counted up (+1). When the programming is finished, the contents of the warning counter 49 are stored in the history counter 50 for the operator. Here, the history counter 50 is constructed so as to be capable of storing histories concerning five previous programming operations, for instance, with histories before that being overwritten and deleted.

As described above, as to the history counter 50, when the operator inputs the ID information 48, data of the history counter 50 corresponding to the ID information is read, corresponding caution messages (whose concrete contents are shown in FIG. 1) in the caution message table 46 are displayed in the descending order of the count values of the warning counter 50 concerning the previous programming operations. Further, the count values of the history counter 50 are converted into a graph in a time-series manner and are displayed along with corresponding history messages in the history message table 47 (whose concrete contents are shown in FIG. 1).

It should be noted here that the details of the various control programs stored in the input data check control portion 39 described above will be described later with reference to flowcharts.

The screen processing portion 31 displays the display characters at a predetermined address in a predetermined color in accordance with the highlight information 52 stored in the highlight information area described above. The resetting of the highlight is achieved by clearing (initializing) the designated color information in the highlight information area.

FIG. 3 is a table showing how inputted numerical value data is interpreted depending on whether the data is given a decimal point or not in a system adopting a minimum command unit (for instance, any one of 10 $\mu$m, 1 $\mu$m, and Sub $\mu$m) predetermined by the machine of the NC device in the case of a specification, in which if the input data of the NC device is not given a decimal point, the input data is dealt with in the minimum command unit, and a specification in which if the input data is not given a decimal point, the data is dealt with in the mm unit. Note that data concerning these specifications is stored in the system parameter 21 area of the memory 2 described above.

As shown in this table, for instance, in the case of the decimal point input necessary type under the 1 $\mu$m command (1=1 $\mu$m) specification, if data without a decimal point is inputted, this data is interpreted in the 1 $\mu$m unit and, if data with a decimal point is inputted, the input data is interpreted as commanded (in the mm unit). On the other hand, in the case of the decimal point input unnecessary type, if data without a decimal point is inputted, the input data is interpreted in the 1 mm unit and, if data with a decimal point is inputted, this data is interpreted as commanded (in the mm unit). More specifically, in the case of a 1 $\mu$m command of the decimal point necessary type, for instance, if a value "123." (data without ".") is inputted, this value is interpreted as "123 $\mu$m". On the other hand, if a value "123." (data with ".") is inputted, this value is interpreted as "123.000 mm". In the case of a 1 $\mu$m command of the decimal point unnecessary type, regardless of whether data without "." (value "123", for instance) or data with "." (value "123.", for instance) is inputted, the same interpretation result as "123.000 mm" is obtained. In this case, in order to obtain a data interpretation result as "123 $\mu$m", it is required to input the data as "0.123" or "0.123.".

FIG. 4 shows the detailed contents of the history counter 50, with the contents of four kinds of input mistake judgments and the number of times of occurrence concerning five previous programming operations are stored for each operator.

The concrete contents of the four kinds of input mistakes shown in FIG. 4 are as follows.

(a) "ITEM OMISSION" denotes a command item input omission and, for instance, a center position (I, J, K) is not commanded in a circular (G2) command.

(b) "DECIMAL POINT OMISSION" indicates a situation where a decimal point is not given to data of an address that is capable of using a decimal point.

(c) "POSITION INCORRECTNESS" denotes a situation where when input data is given a decimal point under an input specification of the decimal point necessary (minimum command unit processing) type or the decimal point unnecessary (mm unit processing) type, the position of the decimal point is incorrect and an integer part of the input data becomes larger than a preset value.

(d) "EXCESSIVELY LARGE/EXCESSIVELY SMALL" indicates a situation where input data is not given a decimal point under an input specification of the decimal point necessary (minimum command unit processing) type and the integer part of the input data becomes smaller than a preset lower limit value or a situation where input data is not given a decimal point under a specification of the decimal point unnecessary (mm unit processing) type and the integer part of the input data becomes larger than a preset upper limit value.

Also, "CTa" to "CTd" of the history counter 50 each denote a counter that stores the number of times of occurrence of its corresponding one of the warning contents "a" to "d" (corresponding to warning contents (a) data input omission, (b) decimal point input type misunderstanding, (c) decimal point position mistake, and (d) decimal point omission). The suffixes "1" to "5" of the counters are numbers respectively assigned to the most recent five histories concerning programming, with "1" denoting the latest history and "5" indicating the oldest history. The contents of these counters are updated by adding "1" to a corresponding warning counter 49 each time a mistake is made during programming and a warning is issued and by transferring a result of the addition to the history counter 50 concurrently with the finishing of the programming.

Next, a check method at the time of programming that is a feature of this first embodiment will be described using flowcharts.

Figure 5:
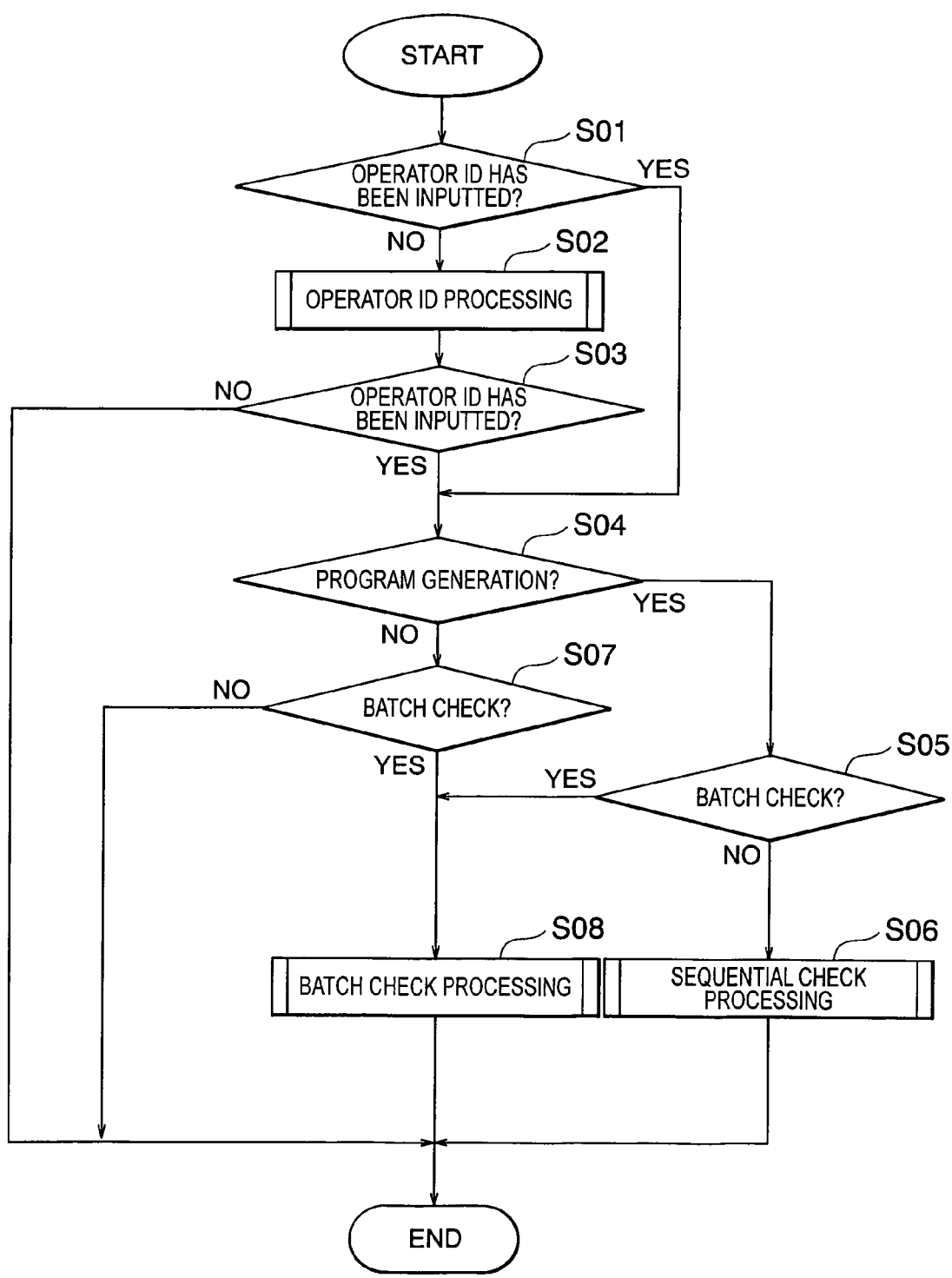
FIG. 5 is a main processing flowchart of a program check/confirmation according to the first embodiment of the present invention.

FIG. 5 is a flowchart showing the processing contents of a program check and a data confirmation. Here, the details of each operation in this flowchart will be separately described with reference to a flowchart in which the operation is developed.

In Step 01, prior to the inputting of a machining program by an operator using the setting display panel 7 of the NC device, a flag is checked in order to judge whether he/she should be allowed to perform programming on an edit screen. This flag is set by operator ID processing in step 02 and is reset at the time when program generation/check work is finished. That is, an ID input screen is displayed until it is confirmed that an ID has been inputted because unless the operator is recognized, it is impossible to notify him/her about his/her warning history at the time of previous programming operations and to store a warning result concerning programming to be performed hereafter. Accordingly, if the operator ID is not yet inputted, a negative result is obtained and the processing proceeds to step 02; if the operator ID has been inputted, the processing proceeds to step 04 in which processing for program generation and check can be performed.

As will be described later (FIG. 6), in step 02, the inputted ID is checked and, if the ID is not yet registered, the ID is newly registered by regarding the operator as a new operator. On the other hand, if the ID is already registered, the warning histories at the time of the previous programming operations are read from the history counter 50 corresponding to the ID and are analyzed, cautions in performing programming are displayed, and changes in warning occurrence (changes in programming skill) and the like are displayed in a time-series manner. Then, the processing proceeds to step 03.

In step 03, an operator ID input FG that is the same as the flag checked in step 01 described above is checked. If a result of the check is negative, this means that it is impossible to identify the operator, so that the following processing is skipped and the processing is ended. If the judgment result is positive (flag is set), the processing proceeds to step 04.

In step 04, it is judged whether or not the contents of an operation to be made hereafter are program generation with reference to the selection of the switches on the setting operation panel 7. If a result of the judgment is positive, the processing branches to step 05 in which it is judged whether a batch check should be performed with reference to the selection of the switches on the setting operation panel 7. If the batch check is not selected, the processing proceeds to step 06 in which sequential check processing is performed. That is, during programming, each time data is sectioned by a decimal point, an address, or an end-of-block (;) through a key input, it is checked whether data inputted immediately before that is appropriate. If it is judged that data review is necessary, a warning message is displayed on the setting display panel 7, thereby notifying the operator about the necessity of the data review.

It should be noted here that the operator performs processing (correction, confirmation, and the like of the input data) based on the contents of the notification.

If it is judged in step 05 that the batch check is selected, the processing branches to step 08. In addition to the branching from step 05, the batch check processing is executed when it is judged in step 04 that program generation is not selected and it is judged in step 07 that the batch check is selected. This batch check is aimed at increasing the work efficiency by performing checks by one operation after the programming is finished. This is because in the case of the sequential check described above, a predetermined warning check is performed each time a key input is sectioned, which leads to a possibility that warnings is frequently issued. In the case of the batch check in this first embodiment, predetermined checks that are the same as those in the case of the sequential check are performed on the program contents displayed on the setting display panel 7 and, when the screen is scrolled and a displayed range is changed, step 08 is executed again.

If it is judged in step 07 described above that the batch check is not selected, the check processing is finished.

Figure 6:
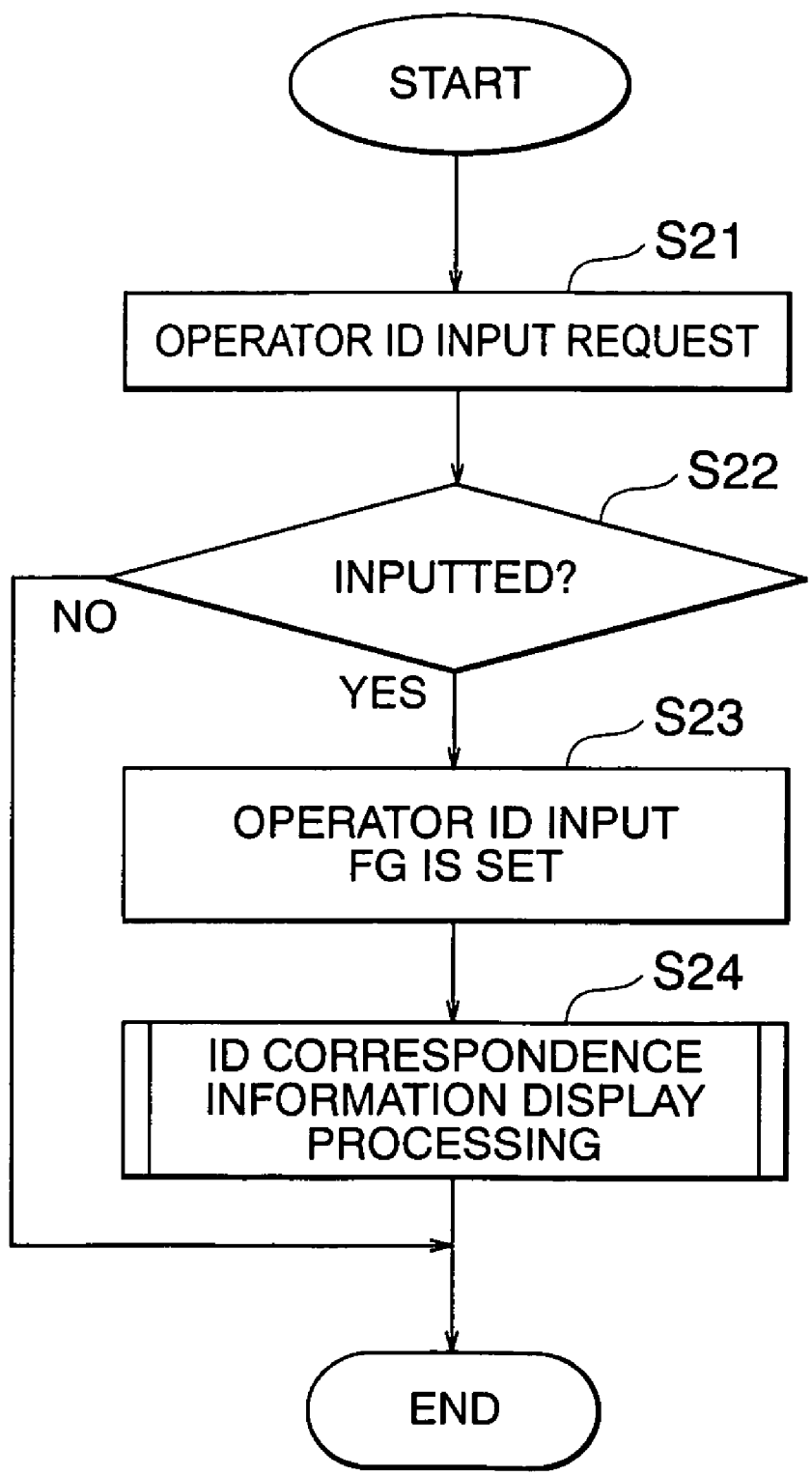
FIG. 6 is an operator ID input processing flowchart according to the first embodiment of the present invention.

FIG. 6 is a flowchart showing the details of the operation performed in step 02 shown in FIG. 5.

In step 21, a screen for requesting the operator to input his/her ID is displayed on the display screen of the setting display panel 7, and it is checked in step 22 whether data is inputted (for instance, it is checked whether the input data is "Null") If a result of this check is negative, the processing is ended without any work and an ID input waiting state is displayed on the screen again. If significant data that is not "Null" is inputted, the processing proceeds to step 23 in which the operator ID input FG is set, and then to step 24 in which ID correspondence information display processing is performed. By the ID correspondence information display processing (whose details will be described later), the contents of the history counter 50 corresponding to the ID are read and the graphical displaying of cautions in performing programming operations and changes in the contents of warnings issued in the past are performed for the operator based on an analysis result of the counter contents in the manner shown in FIG. 1.

Figure 7:
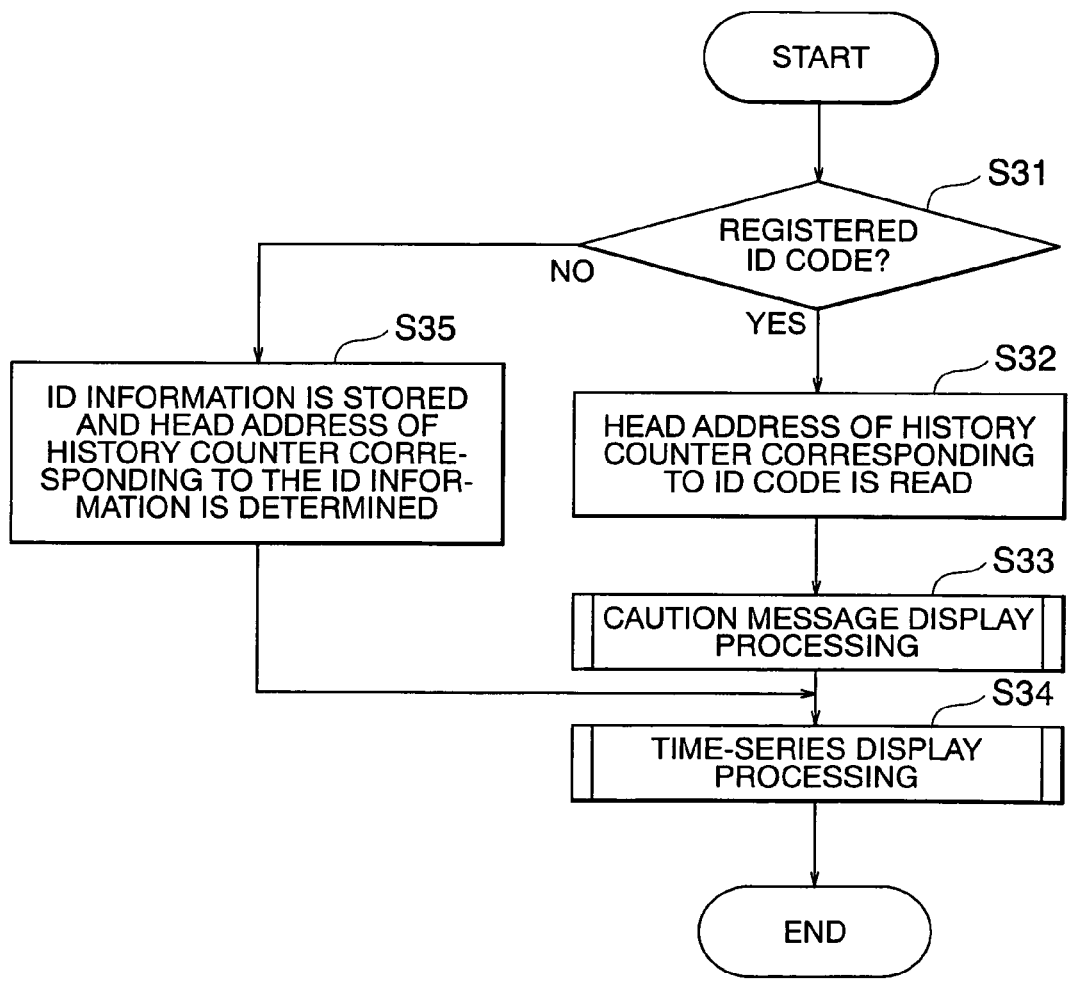
FIG. 7 is an ID correspondence information display processing flowchart according to the first embodiment of the present invention.

FIG. 7 shows the detailed processing performed in step 22 in the flowchart shown in FIG. 6.

The ID information 48 area of the memory 2 is an area for storing the name of the operator and a mark or number unique to the operator for identifying the operator inputted by the operator himself/herself in advance at the time of the first operation. This information is inputted by the operator into an ID information input area displayed on the display screen and is stored through a storing operation. The contents of warnings and the numbers of times of their issuance are stored for a predetermined number of times of programming so as to correspond to the ID information 48. The warning counter 49 counts the numbers of warnings that were each displayed at the time when it was judged that an input mistake was made, and is stored at a memory address corresponding to the ID information of the operator concurrently with the finishing of the programming and the storing of the machining program into the memory.

In step 31, it is judged whether the ID code inputted through the ID input request screen of the setting display panel 7 is an ID code already registered in the ID information 48 area in the data area 5. If it is judged in step 31 that the ID code is already registered, the processing proceeds to step 32 in which the head address of the history counter 50 corresponding to the ID code is read from the ID information 48 area.

In step 33, a caution message concerning programming operations is displayed with reference to the contents of the history counter 50 successively read from the head address.

In step 34, based on the read contents of the history counter 50, the graphical displaying of the contents of warnings and the numbers of times their issuance is performed, and the processing is ended.

If it is judged in step 31 that the inputted ID code is an unregistered code, the processing branches to step 35 in which the ID code is stored in the ID information 48 area, the head address of the history counter corresponding to the ID code is determined, the head address is stored in the ID information 48 area, and the processing is ended.

Figure 8:
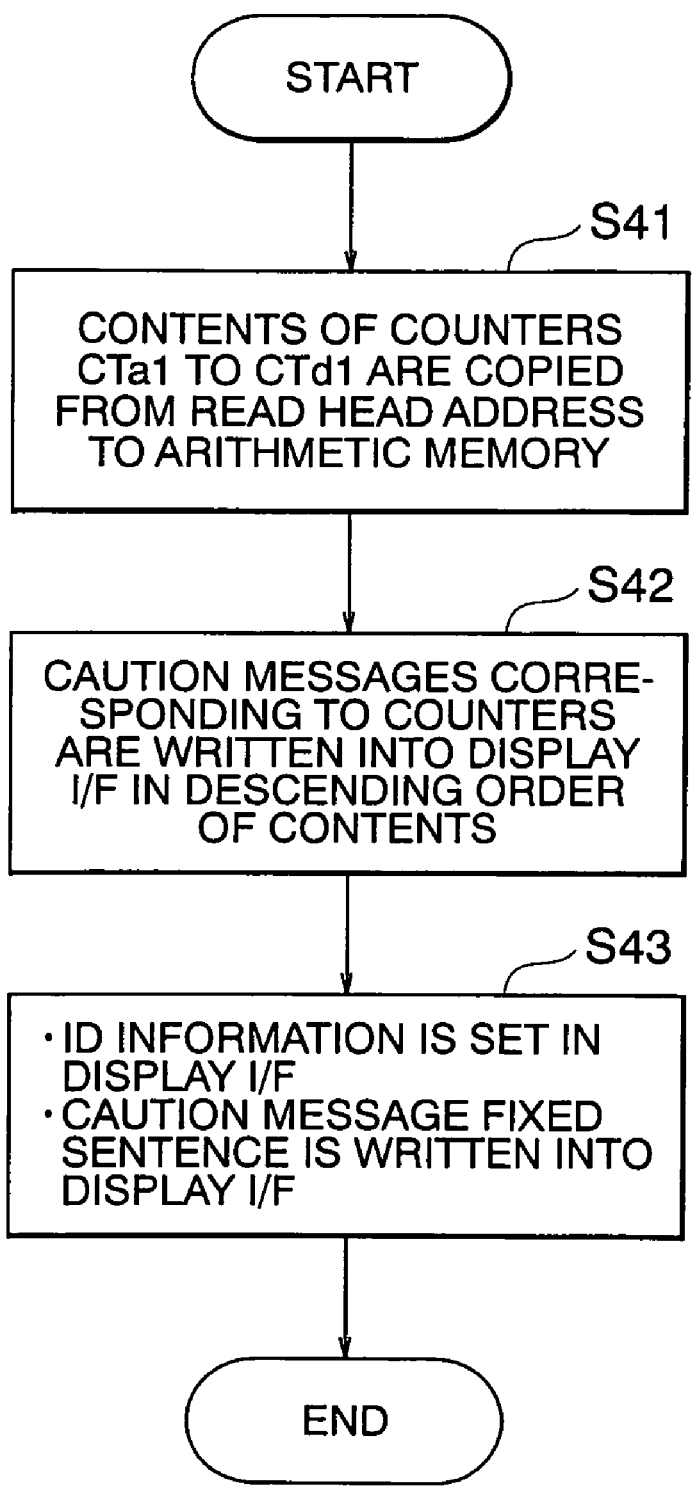
FIG. 8 is a caution message display processing flowchart according to the first embodiment of the present invention.

FIG. 8 shows the detailed processing of the caution message display processing (step 33) shown in FIG. 7. First, the contents (count values) of the counters CTa1 to CTd1 are copied from the head address read in step 41 to a not-shown arithmetic memory. In FIG. 8, "CT" stands for a counter, "a" to "d" respectively correspond to the four kinds of warning contents, and "1" specifies the contents of warnings issued at the time of the latest programming operation. The history counter is constructed so that it is capable of storing warning contents issued at the time of five previous programming operations, with "1" denoting the latest warning record, "2" the next latest warning record, and "5" the oldest warning record.

Instep 42, the counter numbers are arranged in the descending order of the copied counter contents, and the caution message corresponding to each counter number is read from the caution message table 46 and is written into the display I/F data 29 area of the data area 5 as the display I/F data 29.

In step 43, information showing the ID code, name, and the like for identifying the operator is written into the display I/F data 29 area of the data area 5 as the display I/F data 29.

Further, a fixed sentence of the caution message, such as "YOU HAVE TENDENCY TO MAKE INPUT MISTAKE IN THE FOLLOWING ORDER", is read from the caution message table 46 and is written into the display I/F data 29 area of the data area 5 as the display I/F data 29 in a like manner.

Figure 9:
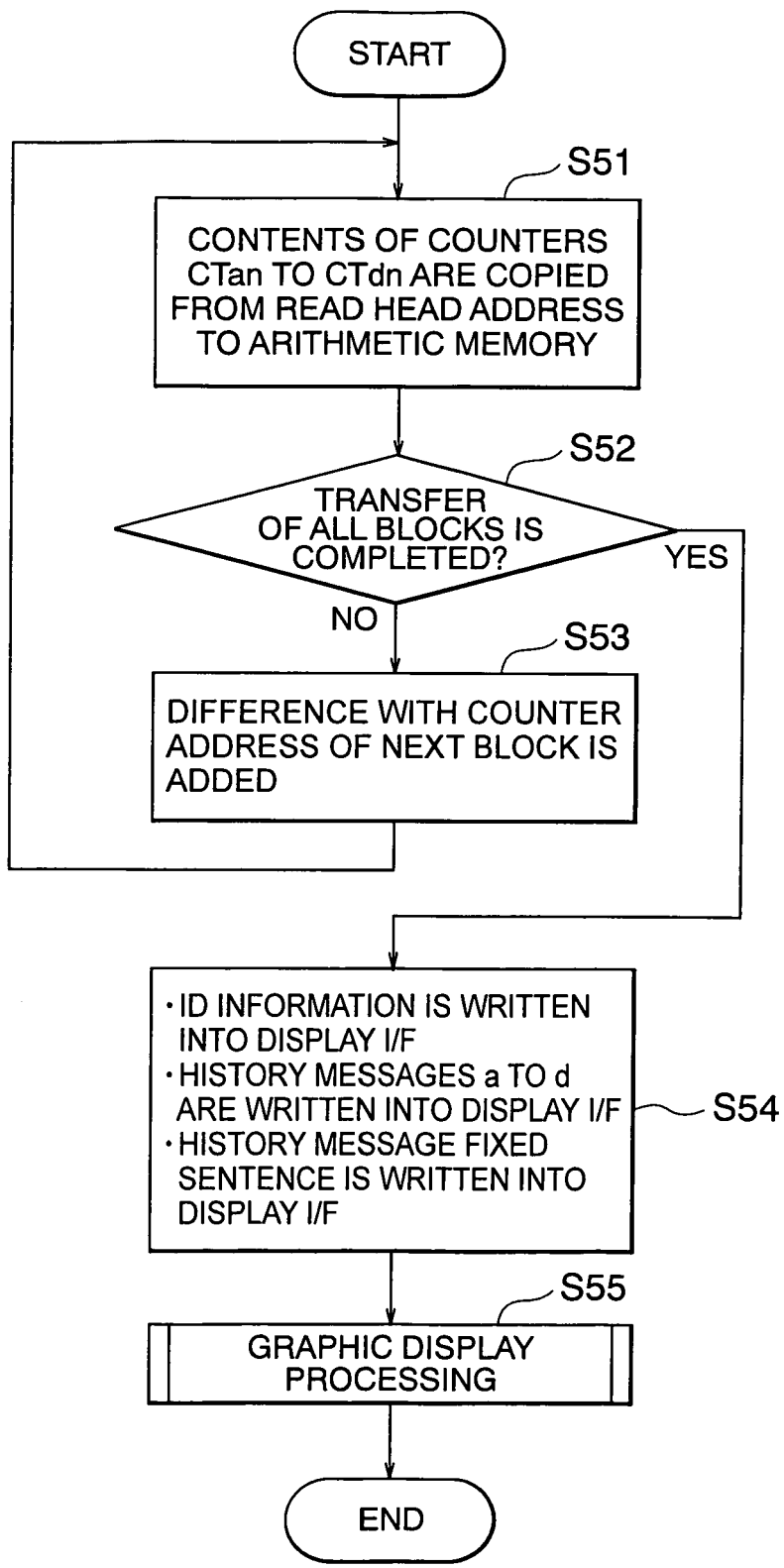
FIG. 9 is a warning history display processing flowchart according to the first embodiment of the present invention.

FIG. 9 shows the detailed processing of the time-series display processing (step 34) shown in FIG. 7.

In step 51, the contents of the counters CTan to CTdn are copied from the read head address to the not-shown arithmetic memory. The marks of the counters are assigned in the manner described above, although the last mark "n" is assigned one of "1" to "5", with "1" corresponding to the latest history and "5" corresponding to the oldest history. Consequently, in step 51, the counter contents of Cta to CTd concerning one programming operation (set as "one block") are copied.

In step 52, it is checked whether the transfer of the contents concerning all of the five programming operations (all blocks) from "1" to "5" is completed. It is possible to make this judgment by setting an initial value "5" in a check counter, decrementing this value by one each time the processing proceeds to step 52, and checking whether the counter value becomes "0". If the transfer of all blocks is not yet completed, the processing proceeds to step 53 in which a difference with the counter address of the next block (whose maximum value becomes "4" because there are provided four counters a, b, c, and d in this first embodiment) is added and the processing returns to step 51 in which the transfer of the next block is performed.

If it is judged in step 52 that the transfer of all blocks is completed, the processing branches to step 54 in which the ID information for identifying the operator is written into the display I/F data 29 area of the data area 5 as the display I/F data 29, and the history messages a "DATA INPUT OMISSION" to d "DECIMAL POINT OMISSION RESULTS IN EXTREMELY LARGE/EXTREMELY SMALL VALUE" and a fixed sentence for the history messages, such as "THE FOLLOWING IS YOUR TENDENCY UNTIL THE LATEST PROGRAMMING OPERATION", are read from the history message table 47 and are written into a predetermined area of the memory as the display I/F data 29. As a result of the processing described above, the ID information and the display messages are displayed on the display portion of the setting display panel 7.

In step 55, the contents of warnings at the time of the five previous programming operations transferred from the history counter 50 are graphically displayed in a time-series manner. In this embodiment, the contents of warnings at the time of the five previous programming operations are respectively assigned X coordinate positions at arbitrary intervals, the numbers of times of their issuance are respectively assigned to Y coordinate values to determine intersection coordinates, and they are connected with straight lines by designating colors with basic graphic commands. In this manner, changes in the numbers of times of occurrence of the warning are graphically displayed in a time-series manner. By repeatedly executing this processing for each of the counters a, b, c, and d, it is possible to display all warning contents. This processing is the same as general software processing for graphically displaying a mathematical table and therefore the concrete description thereof is omitted. Like in the case of the history message, the graphed history is written into the memory as the display I/F data 29 and is displayed on the display portion of the setting display panel 7.

Figure 10:
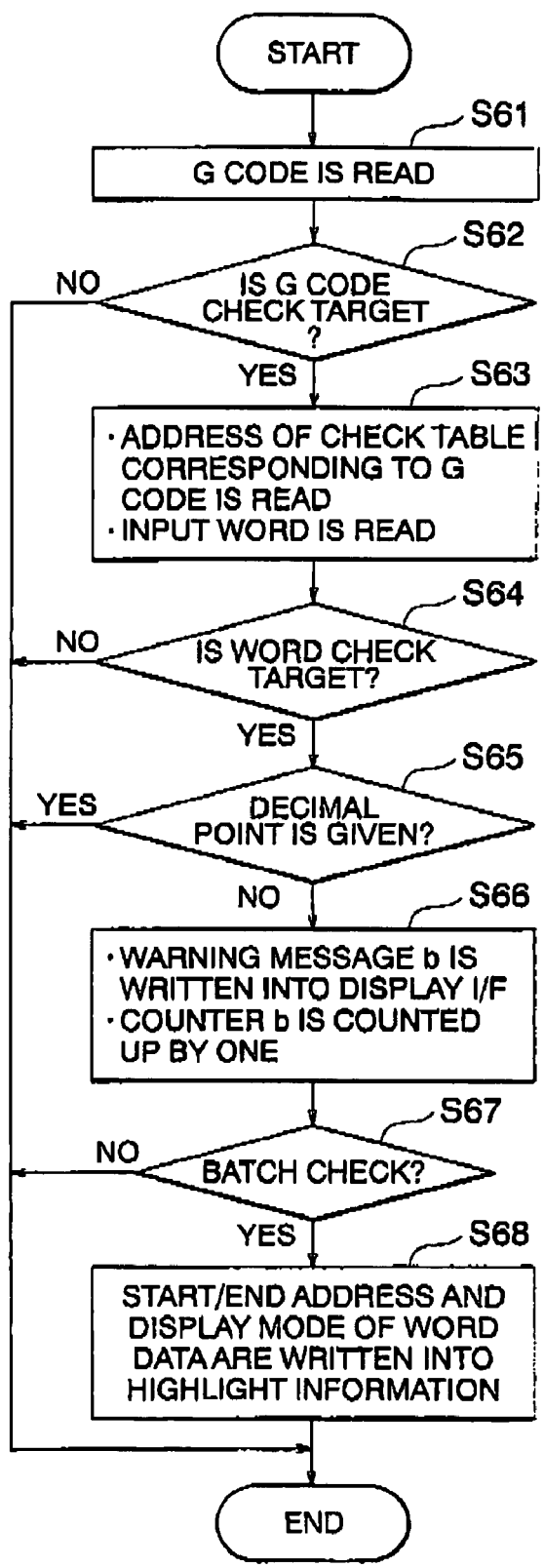
FIG. 10 is a decimal point omission unconditional warning processing flowchart according to the first embodiment of the present invention.

FIG. 10 is a flowchart of the sequential check processing performed in step 06 shown in FIG. 5, with only a check of the presence or absence of a decimal point being illustrated as an example. This processing has been defined so as to be also applicable to the batch check, with the processing concerning the batch check being performed in the last two steps.

Figure 11:
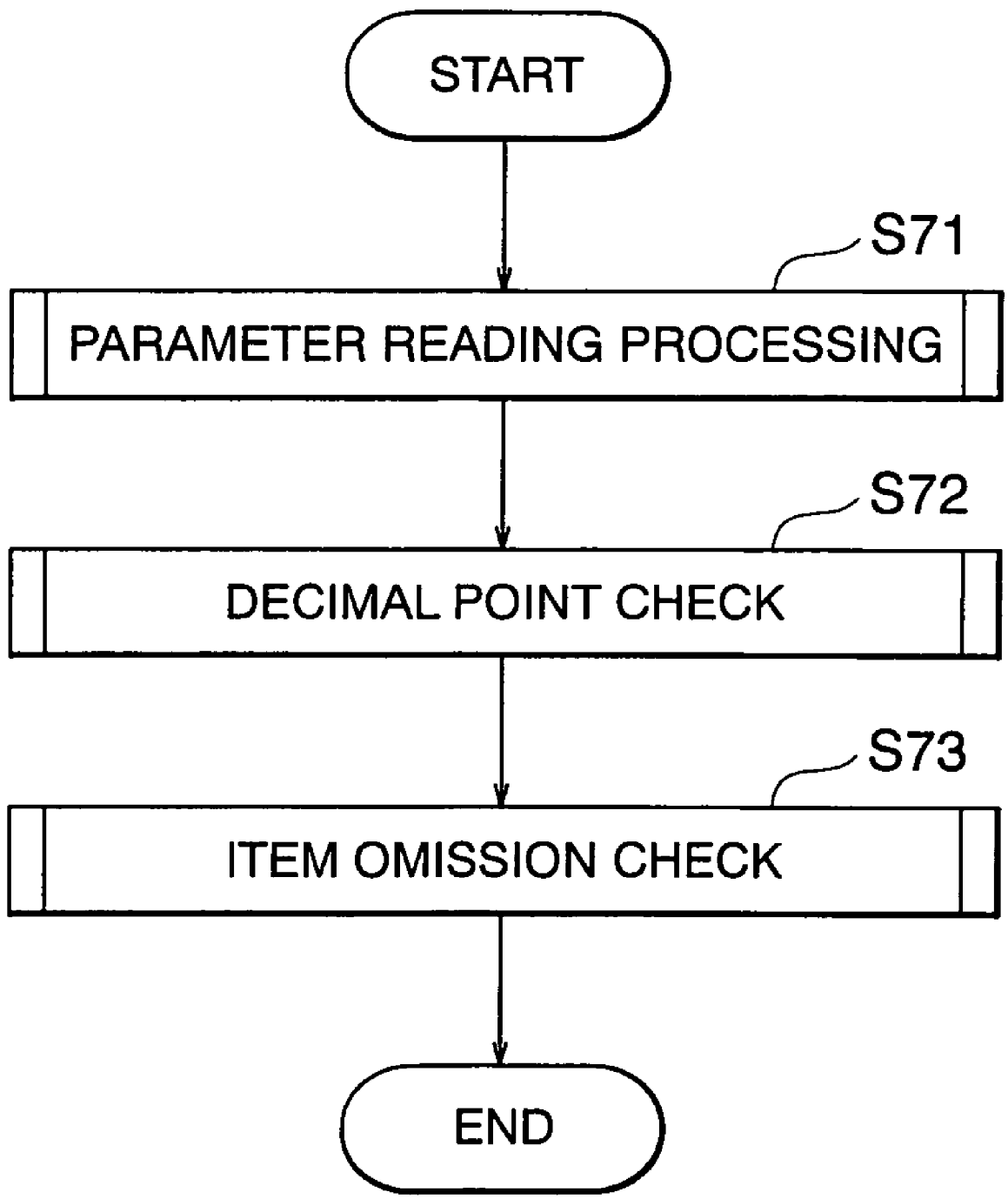
FIG. 11 is an input mistake warning processing flowchart through sequential processing according to the first embodiment of the present invention.

In this example, when no decimal point is inputted into the data of an address that is capable of using a decimal point, a warning is unconditionally issued. (In the NC device to which this first embodiment relates, basically, the decimal point input is performed depending on the will of the operator, although as a check method, there is provided a case where on the precondition that a decimal point is always inputted into an address that is capable of using a decimal point, a warning is issued when no decimal point is inputted by regarding this situation as an input omission. In FIG. 11, in place of the case where only the presence or absence of a decimal point is checked, there is shown a case where checks of the input mistake or input omission of a decimal point, excessively large input value, and excessively small input value, and a check of the input omission of an indispensable input item are sequentially performed).

In FIG. 10, a G code that is currently inputted is read in step 61. In step 62, it is checked whether the G code is a target of the decimal point check. This operation is performed through searching of the decimal point check target G code table 40 in which G codes, whose G commands each contain an address that is capable of using a decimal point, are collected. Here, if the G code is found in the table, the processing proceeds to step 63 in which the address of the decimal point check target word table 41 stored so as to correspond to each G code in the decimal point check target G code table 40 is read. Further, an address code to be inputted after the G code is read. If the G code is not found in step 62, this means that the decimal point check is unnecessary, so that the processing is ended.

In step 64, it is checked whether the address code of the read word data (address word, such as X, Y, Z, and numerical value data following the word that are sectioned through the inputting of an address word or an end-of-block (;)) exists in the decimal point check target word table 41 starting from the read address. Here, if a result of the judgment is positive, the processing proceeds to step 65 in which it is judged whether data inputted after the address contains a decimal point. If a result of the judgment in step 65 is negative, the processing proceeds to step 66 in which it is judged that a decimal point input is omitted because the data of an address that is capable of using a decimal point is not given a decimal point and therefore the warning message "IS DECIMAL POINT OMITTED?" is read from the warning message table 45 and is written into the display I/F29. Also, the warning counter b in the warning counter 49 is counted up by one.

If it is judged in step 64 that the data is not a target of the check or if it is judged in step 65 that the data contains a decimal point, the following processing is skipped.

Step 67 and step 68 are prepared for the batch check and are not applied to the sequential check. In step 67, the check mode selected with the setting display panel 7 is read and, if it is found that the batch check is selected, the processing proceeds to step 68 in which the start address and the end address (or data length) of the word data and a display mode (such as the display color and highlight) are written into the highlight information 52 area. Based on this highlight information 52, the screen processing portion 31 displays display information in a region (from a start point to an end point) designated on the display screen in a color of the designated display mode or in a highlight manner, thereby displaying the designated region in a manner in which it is easily distinguished from other regions. If the batch check is not selected, the processing described above is not performed.

FIG. 11 is a flowchart of processing that is originally performed in the sequential check and FIG. 12 shows a list of three kinds of misinput warning judgment values in each minimum command unit system of the NC device. In this first embodiment, a case where as the judgment values, only one pair for coordinate values, such as X, Y, and Z, is provided is described as an example. However, it is also possible to prepare the judgment values so as to correspond to other addresses or respective addresses.

FIG. 12 is described here. This table shows a setting example of parameters (warning judgment value table) for discriminating among decimal point giving mistakes and the like for each minimum command unit system of 10 $\mu$m, 1 $\mu$m, or 0.1 $\mu$m and, in an actual case, there are used parameter values on one row in this table that is the same as the machine command unit system. The values set in this table can be changed as appropriate depending on the size of the machine and the like. Note that as to the names of the parameters, "PD" stands for parameter data, numerical values such as 100 and 010 are each a value obtained by multiplying the command unit system by 10 (for instance, 10 $\mu$is described as "100" and Sub $\mu$ (0.1$\mu$) is written as "001"), and "SM", "DT", and "LG" at the end of the parameter names respectively stand for "SMALL", "DECIMAL-POINT", and "LARGE" that respectively correspond to the "excessively small", "decimal point", and "excessively large".

In each of these parameters, there is set a boundary value for issuing a warning based on a machine movable range work size in the command unit system (10$\mu$, 1$\mu$, 0.1$\mu$) determined by the machine specification. For instance, an excessively small command value prevention value is set to "1 mm" (indiscriminately speaking is impossible because there are various works, but such a small command value is generally inconsiderable, so that it is judged that there is made a decimal point giving mistake or a mistake in the number of digits of a numerical value in the minimum command unit), a decimal point addition prevention value is set to "200" (ordinarily, such a length of 200 mm is not commanded unless a radius value having a large curvature is inputted, so that if a decimal point is given to the end of a numerical value exceeding 200, it is judged that a key input mistake is made), and an excessively large command value prevention value is set to "200" for the same reason. However, when the size of a table of the machine, on which a work is placed, is large, these values may be set in accordance with the maximum size specified on a machining drawing. In the first embodiment, if no decimal point is given in a system in which it is possible to use a decimal point, a warning is issued unconditionally. In a second example, however, it is judged whether a command value becomes unnatural with reference to an inputted numerical value and the presence or absence of a decimal point and, if the value is judged as unnatural, a warning is issued before the determination of the numerical value, thereby urging an operator to make a correction.

Here, the excessively small command value prevention is a reference value with which when no decimal point is given to an input numerical value but a mm input (inputted integer is dealt with in a mm unit) is not performed, it is judged that the inputted numerical value is a very small value that is not commanded in usual cases. The decimal point giving prevention is a reference value with which it is judged that a decimal point is mistakenly given and therefore a command value becomes excessively large (in the case of an input of "201." for instance, this value is interpreted as a command value "201 mm", but when it is judged that such a large value is commanded because a decimal point is given at the end of the value, if "200" is set in the parameter "PD010DT", for instance, it is judged that a set value is exceeded, so that there is warned the possibility of an input mistake). The excessively large command value prevention is a reference value with which it is judged that at the time of the mm input, for instance, it is intended to input "20.5" but "205" is mistakenly inputted while omitting a decimal point, so that the command value becomes excessively large. As described above, these values can be set/changed arbitrarily in accordance with the machine or the work.

It should be noted here that in FIG. 12, the units of numerical values (100, 1000, 10000) of the excessively small command value prevention data are respectively "10μ", "1μ", and "Sub micron" (that is, every numerical value specifies the same length of 1 mm), and the unit of the numerical value (200) of the decimal point giving prevention and the excessively large command value prevention is "mm".

In step 71, the set values "1000", "200", and "200" of the three kinds of parameters "PD010SM", "PD010DT", and "PD010LG" corresponding to the minimum command unit system (such as 1 μm command, this selection is set in the system parameter 21) of the NC are read from the warning judgment value table 42 shown in FIG. 12.

In step 72, a decimal point check and a validity check of the largeness of an input value are performed. In step 73, an indispensable item input omission check is performed on a predetermined G command.

Figure 13:
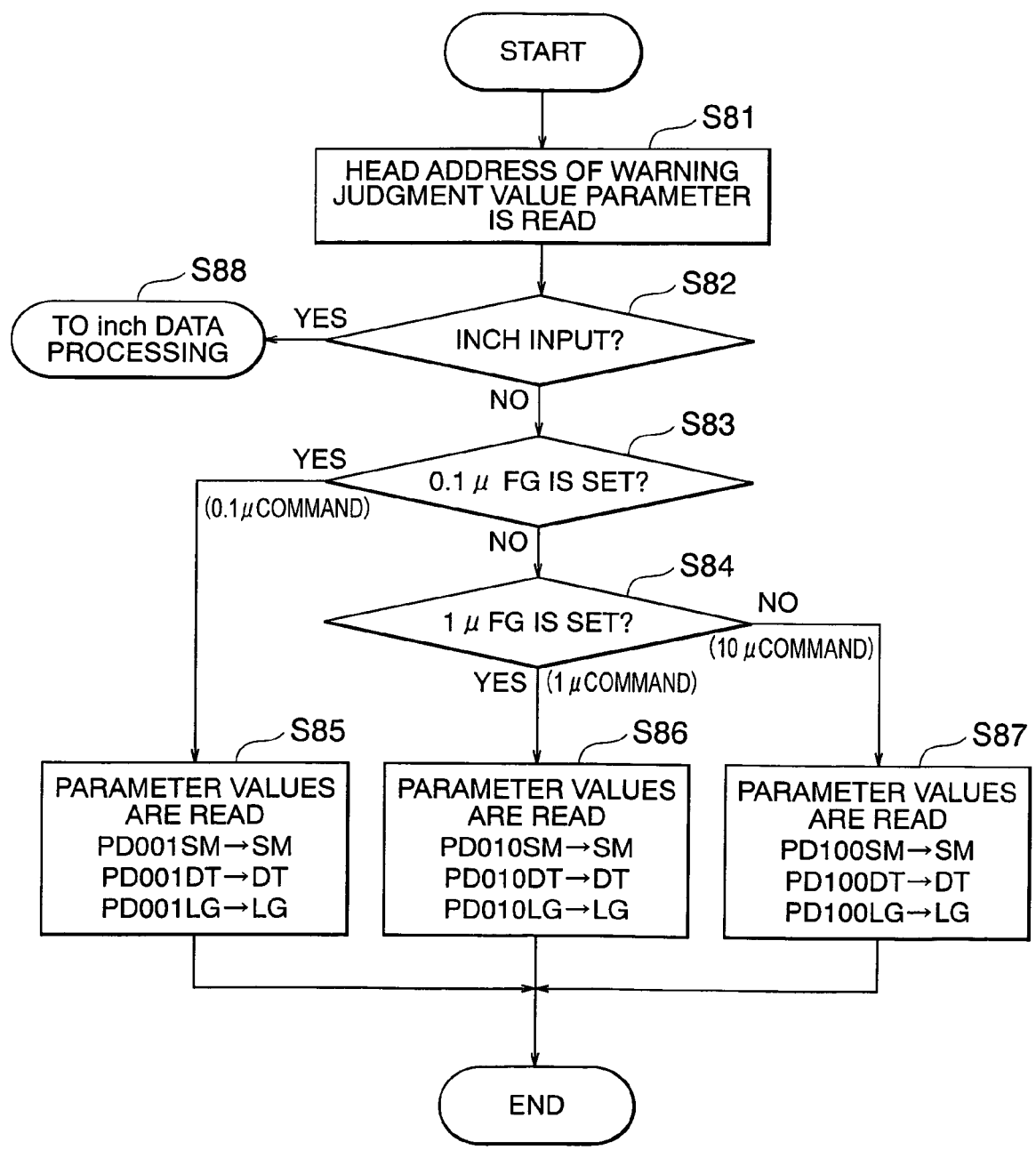
FIG. 13 is an input data discrimination preparation processing flowchart according to the first embodiment of the present invention.

FIG. 13 shows processing for reading the parameters for the input value validity check and shows the detailed contents of the processing performed in step 71 shown in FIG. 11. Instep 81, first, the head address of the warning judgment value table is read (offset value given in each minimum command unit is added to this address, thereby determining the head address of a desired parameter). In step 82, an inch input flag of the system parameter 21 is checked and, if this flag is set, inch data processing is performed for inch inputting (this is the same processing as a metric input to be described later and, even in the case of the inch input, the parameters corresponding to this are read to registers (SM, DT, LG), so that it is possible to perform the check in the same manner as in the case of the metric input).

In step 83, a minimum command unit flag of the system parameter 21 is checked and, if a 0.1 μm flag is set, the processing branches to step 85 in which three parameters for the excessively small command value prevention, the decimal point giving prevention, and the excessively large command value prevention corresponding to the minimum command unit "0.1 μm" are read and respectively written into the arithmetic memories SM, DT, and LG. Then, the processing is ended. If it is found in step 83 that the flag is not set, the processing proceeds to step 84 in which a minimum command unit flag of the system parameter 21 is checked in a like manner and, if a 1 μm flag is set, the processing branches to step 86 in which three parameters corresponding to the minimum command unit "1 μm" are read and respectively written into the arithmetic memories SM, DT, and LG. Then, the processing is ended. If it is found in step 84 that the flag is not set, the inputted command is regarded as a 10 μm command and the processing branches to step 87 in which three parameters corresponding to the minimum command unit of 10 μm are read and respectively written into the arithmetic memories SM, DT, and LG. Then, the processing is ended.

Figure 14:
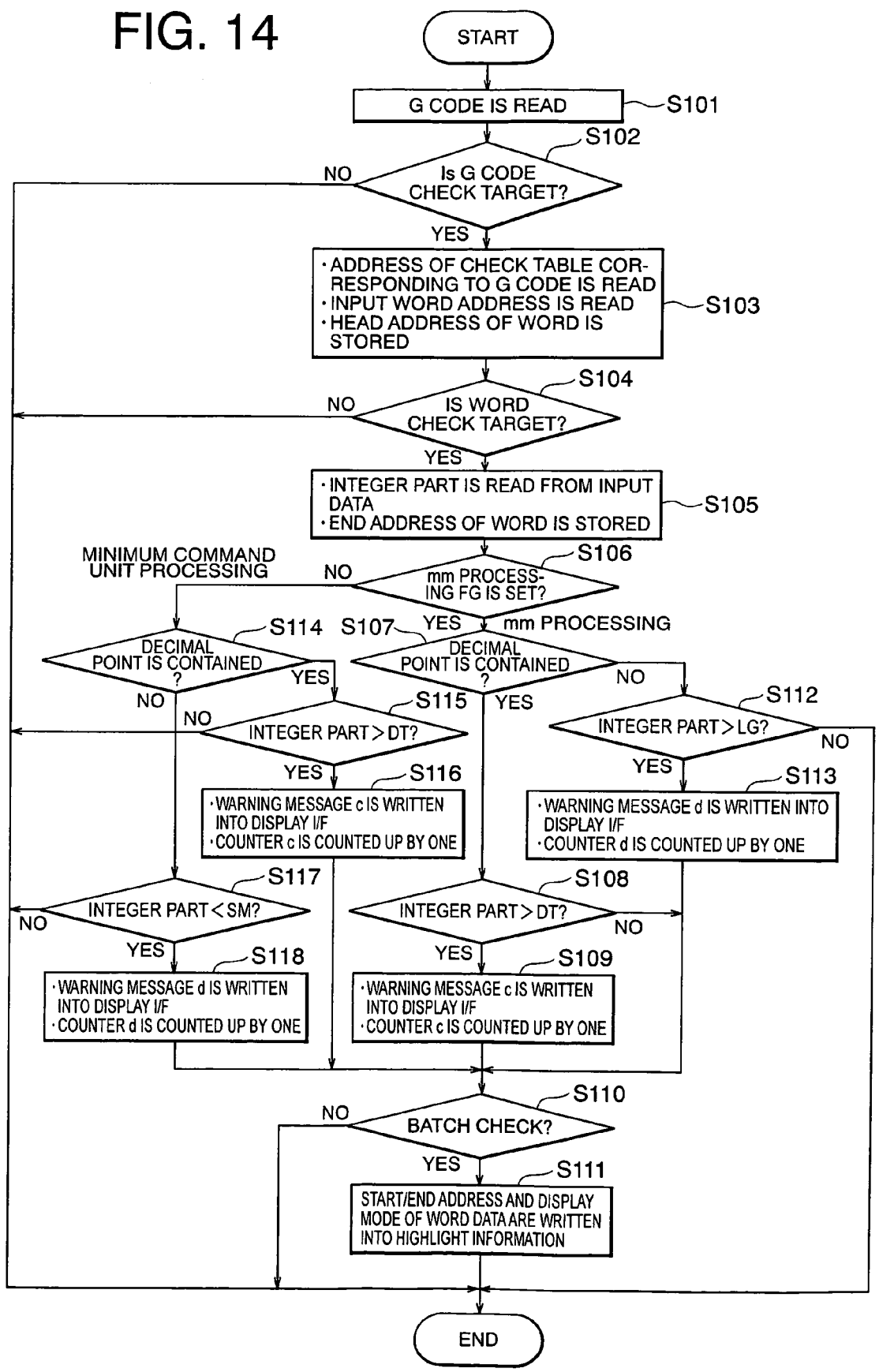
FIG. 14 is an input data comparison processing flowchart according to the first embodiment of the present invention.

FIG. 14 shows the detailed processing of the decimal point check (step 72) shown in FIG. 11. The actual check contents include three kinds of checks based on comparison with the three parameters that are the excessively small command value prevention (for judging whether an input value is excessively small or a decimal point is omitted), the decimal point giving prevention (if a decimal point is given, the input value becomes excessively large), and the excessively large command value prevention (for judging whether an input value is excessively large or a decimal point position mistake is made).

In step 101, the G code that is currently inputted is read. In step 102, it is checked whether the G code is a target of the decimal point check. This operation is performed through searching of the decimal point check target G code table 40 in which G codes, whose G commands each contain an address that is capable of using a decimal point, are collected. Here, if the G code is found in the table, the processing proceeds to step 103 in which there is read the address of the decimal point check target word table 41 stored in the decimal point check target G code table 40 so as to correspond to each G code. Further, the address code inputted after the G code is read and the head address of the word (storage position of the address code) is stored (here, the storage of the head address of the word is the processing required at the time of the batch check). If the G code is not found in step 102, this means that the decimal point check is unnecessary, so that the processing is ended.

In step 104, it is checked whether the address code of the read word data (address word, such as X, Y, and Z, and a numerical value data following the word that are sectioned through the inputting of an address word or an end-of-block (;)) exists in the decimal point check target word table 41 starting from the read address. Here, if a result of the judgment is positive, the processing proceeds to step 105 in which the integer part of the data inputted after the address is read and the end address of the word data is further stored (here, the end address storage is the processing that is necessary at the time of the batch check). If a result of the judgment in step 104 is negative, it is not required to perform a check of the data, so that the processing is ended.

In step 106, it is checked whether the mm processing flag in the system parameter 21 is set. This flag indicates the selection of the input mode of NC data in FIG. 3 that are the "decimal point necessary" type in which in order to have an input command value (such as 25) interpreted as "25 mm", it is required to input this value as "25." with a decimal point (at the time of the 1 μm unit, for instance, if no decimal point is given, the value is interpreted as "25" μm) and the "decimal point unnecessary" type in which it is sufficient that the value is merely inputted as "25" (if no decimal point is given, the value is automatically regarded as a value in the mm unit). Here, if the flag is set (mm unit processing), the processing proceeds to step 107; if the flag is reset (minimum command unit processing), the processing branches to step 114.

In step 107, it is checked whether the input data contains a decimal point and, if the result is positive, the processing proceeds to step 108 in which the integer part read in step 105 described above is compared with the parameter value DT read in step 85 to step 87 in FIG. 13 described above. If the condition of "integer part>DT" is satisfied, the processing proceeds to step 109 in which the warning message c "DECIMAL POINT MAKES INPUT VALUE EXCESSIVELY LARGE" is written into the display I/F 29, the warning counter c is counted up (+1), and the processing proceeds to step 110. If the condition of "integer part>DT" is not satisfied in step 108, the processing branches to step 110.

If it is judged in step 107 that no decimal point is contained, the processing branches to step 112 in which the integer part and the parameter value LG are compared with each other in a like manner. If the condition of "integer part>LG" is satisfied, the processing proceeds to step 113 in which the warning message d "INPUT VALUE IS ABNORMAL IF DECIMAL POINT IS NOT GIVEN" is written into the display I/F 29, the warning counter d is counted up (+1), and the processing proceeds to step 110. In step 112, if the condition of "integer part>LG" is not satisfied, the processing is ended.

In step 106, if the flag is reset (minimum command unit processing), the processing branches to step 114 in which it is checked whether a decimal point is contained in the input data and, if a decimal point is contained, the processing further proceeds to step 115 in which the integer part is compared with a parameter value DT in a like manner. If the condition of "integer part>DT" is satisfied, the processing proceeds to step 116 in which the warning message c "DECIMAL POINT MAKES INPUT VALUE EXCESSIVELY LARGE" is written into the display I/F 29, the warning counter c is counted up (+1), and the processing proceeds to step 110. If the condition of "integer part>DT" is not satisfied in step 115, the processing is ended.

If it is judged in step 114 that no decimal point is contained, the processing branches to step 117 in which the integer part is compared with a parameter value SM in a like manner. If the condition of "integer part<SM" is satisfied, the processing proceeds to step 118 in which the warning message d "INPUT VALUE IS ABNORMAL IF DECIMAL POINT IS NOT GIVEN" is written into the display I/F 29, the warning counter d is counted up (+1), and the processing proceeds to step 110. In step 117, if the condition of "integer part<SM" is not satisfied, the processing is ended.

In the above description, it is assumed that the number of digits of the input value is correctly commanded within the maximum number of digits. However, by setting a parameter of the maximum number of inputtable digits and comparing an input value with the parameter, it is possible to perform a check of the number of digits of an input value at the time of inputting and to urge an operator to make a correction by issuing a warning if an excess of digit number occurs. In this case, it is possible to find the excess of digit number in advance that has conventionally been impossible unless the machining program is analyzed/executed after programming. As a result, it becomes possible to enhance the perfection of the machining program.

Step 110 and step 111 are provided in order to perform the decimal point check processing in the batch check mode. In step 110, it is checked whether the batch check mode is selected and, if the batch check is selected, the processing proceeds to step 111 in which the start/end address and the display mode, such as a highlight display color, of the word data (address+numerical value data), for which the warning judgment has been made, are set in the highlight information 52 and the processing is ended. Based on the information set in the highlight information 52, the screen processing portion 31 highlights and displays a predetermined range of the machining program displayed on the display portion of the setting display panel 7.

Figure 15:
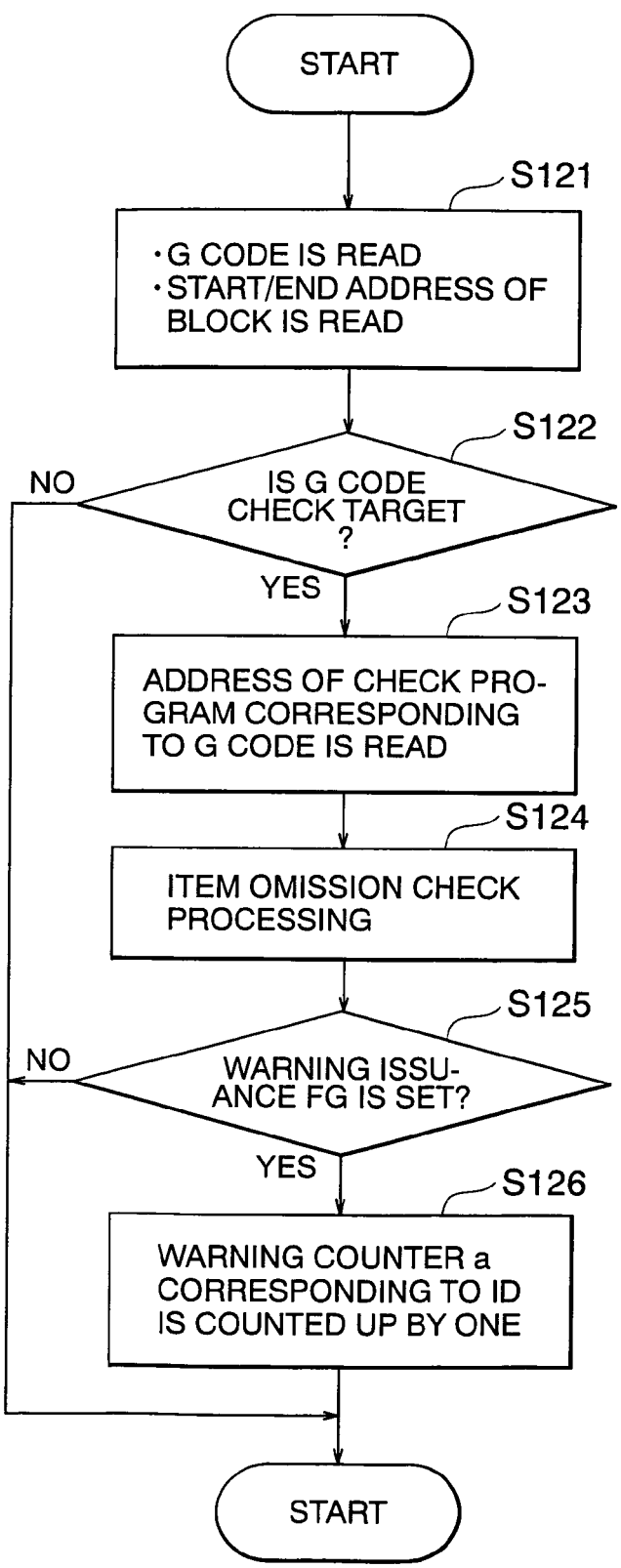
FIG. 15 is a command item omission check processing flowchart according to the first embodiment of the present invention.

FIG. 15 shows item omission check processing in which it is checked whether the code is registered in the item omission check target G code parameter 43 (in which the head address of the storage memory of a check program corresponding to the G command codes are stored, so that when any command items (items) in the G command are omitted and an error occurs due to the impossibility of analysis, it is checked whether the G code that is currently created is a target code and, if the result of the check is positive, the check program is activated and it is checked whether any required items are omitted and, if the result of the check is positive, a warning is issued in order to urge the operator to input the items. There is also a check program that is commonly usable like the G2/G3 code) and, if the code is not registered, this means that a check is unnecessary. As described above, during the programming of a machining program, it is possible to warn each item omission and to urge an operator to correct the program immediately, so that the perfection of the machining program is enhanced. Therefore, unlike a conventional case, there is eliminated a wasted time from the generation of a machining program to the correction thereof consumed when any command item omissions are found for the first time when the machining program is executed by an NC device and the program is re-edited. As a result, the production efficiency is improved.

In step 121, the commanded G code is read and the start address (memory address) and the end address (memory address) of the block are read (this address is information necessary for the batch check) In step 122, it is checked whether the read G code is a target code of the item omission check. Like in the case of the decimal point check, this operation is performed by judging whether the read G code is registered in the item omission target G code table 43, because target G codes and a predetermined address in an indispensable address check table 44, in which the activation addresses (addresses on the memory) of programs for checking the presence or absence of address codes that are required in each G command at the minimum are collected so as to correspond to respective G codes, are registered in the item omission target G code table 43. If the G code is not registered in the table, this means that the code is not a target code, so that the processing is ended. If the G code is registered, the processing proceeds to step 123 in which the activation address of a check program of the G command stored so as to correspond to the read G code is read and the program is activated.

In step 124, the activated check program is executed and it is checked whether input data includes any item omissions. If the result of this check is positive, the warning message is set, a warning issuance flag is set, and the processing is ended. In step 125, the warning issuance flag showing the check result of the item omission check processing is checked and, if the flag is set, this means that there exist some item omissions, so that the processing proceeds to step 127 in which the warning counter "a" corresponding to the ID is counted up (+1). If the flag is not set, this means that all the required data is inputted, so that the processing is ended.

Figure 16:
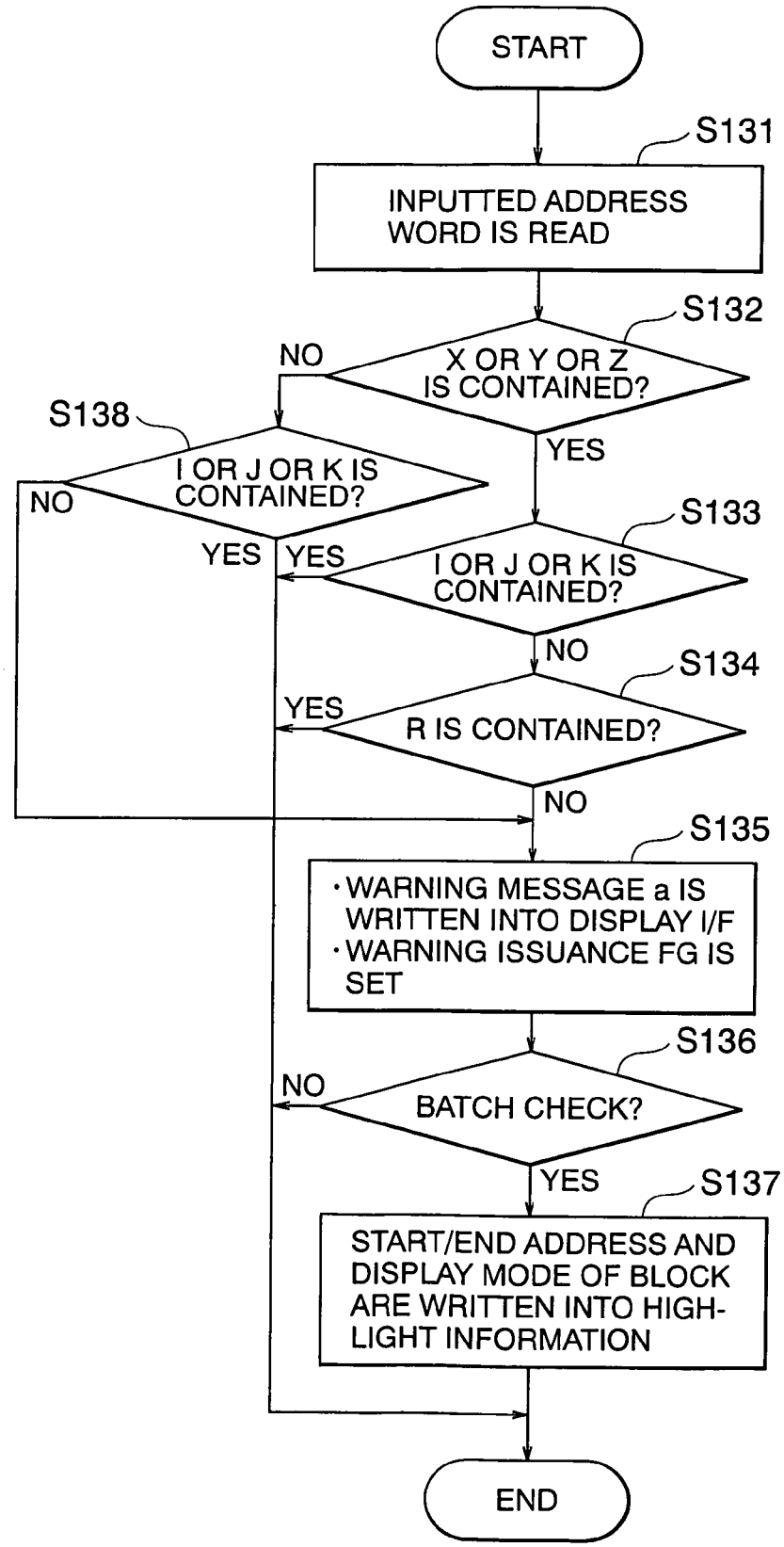
FIG. 16 is a G2/G3 input omission check flowchart according to the first embodiment of the present invention.
Figure 2:
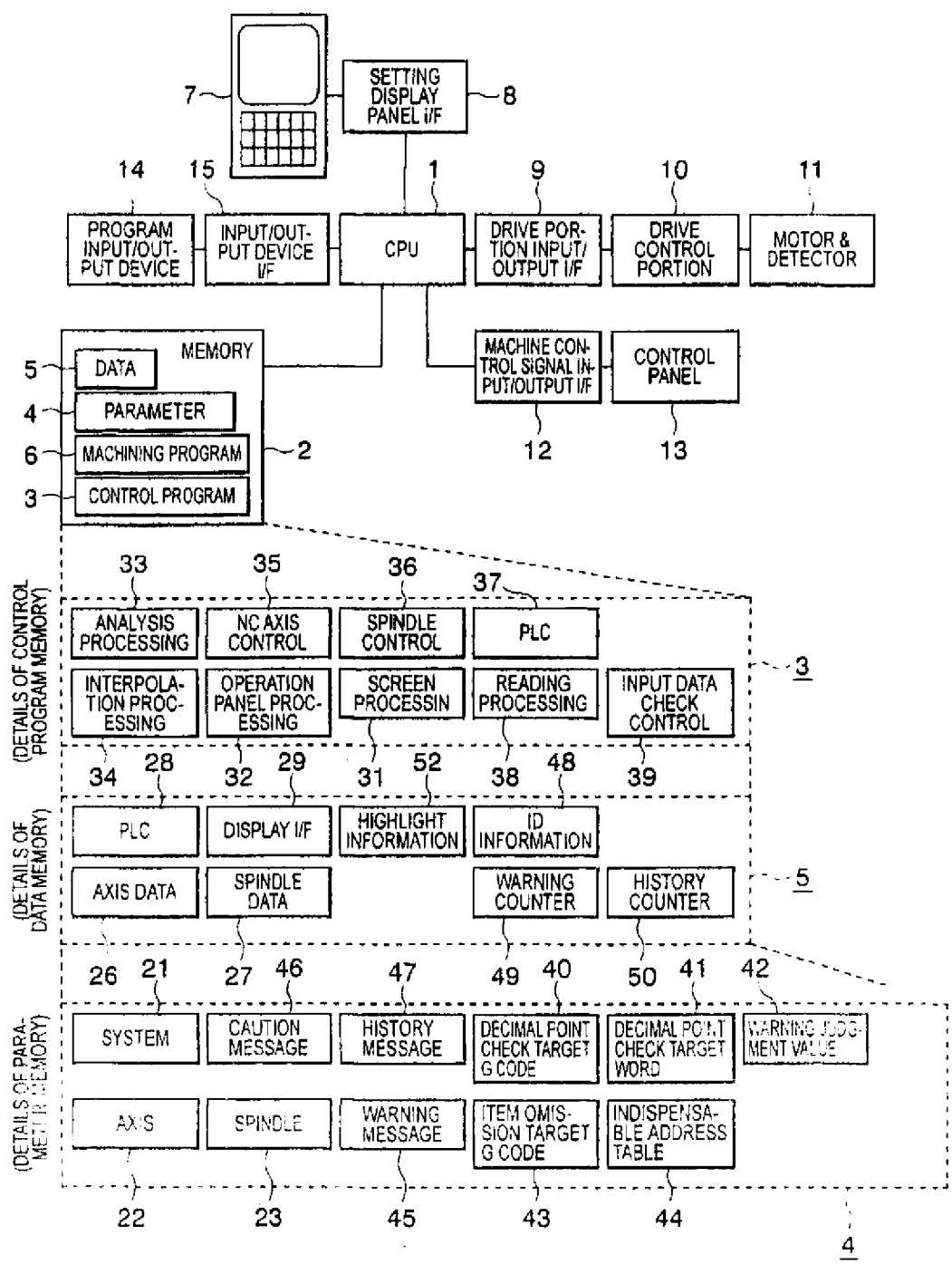
Figure 15:
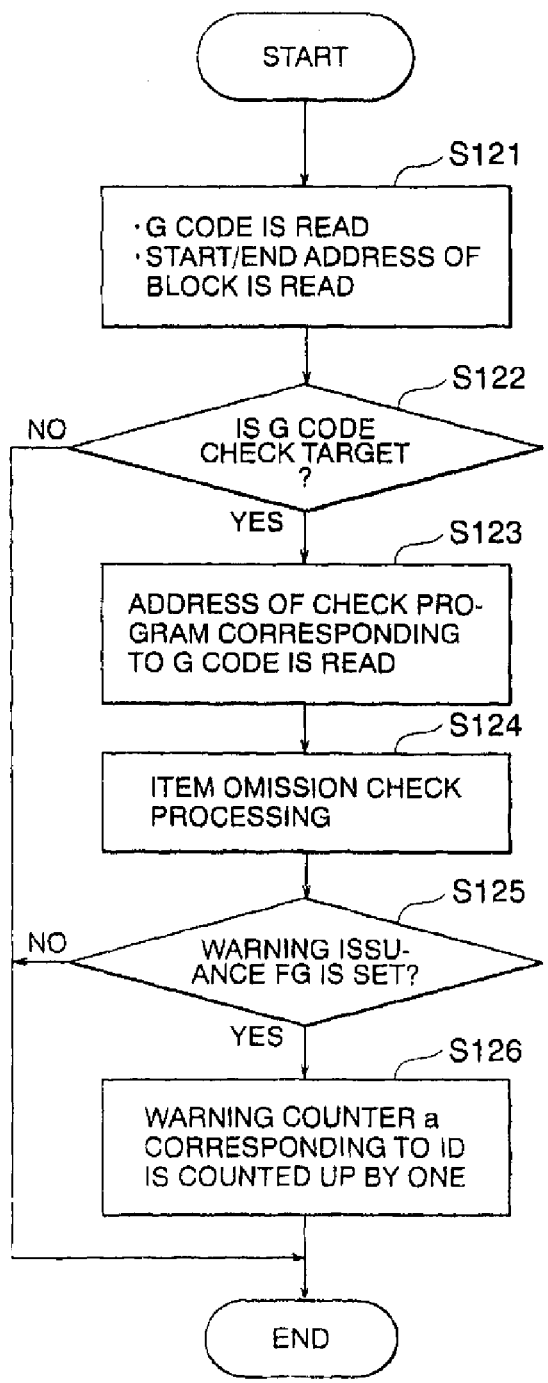

FIG. 16 is an item omission check program for the G02 or G03 command (clockwise or counterclockwise circular command), for instance.

The circular command includes a center specifying circular command and a radius specifying circular command. In the case of the center specifying circular command, it becomes possible to execute this command when the rotation direction is commanded with G2 (clockwise) or G3 (counterclockwise) and the end position (X, Y, Z) when viewed from the current position and the center position (I, J, K) are commanded. In the case of the radius specifying circular command, it becomes possible to execute this command when the rotation direction is commanded with G2 (clockwise) or G3 (counterclockwise) and the end position (X, Y, Z) when viewed from the current position as well as the radius and the direction of the center position (±R) are commanded. Here, except for the case of a perfect circle, among respective required items, if the end point coordinate or the center coordinate is not commanded, it is impossible to executed the circular command. In a conventional system, however, an error is not detected until analysis is performed in order to execute the command. Then, machining is suspended and the program is corrected.

In step 131, all the address codes inputted with the G command are read. In step 132, it is checked whether any of codes X, Y, and Z specifying the circular end point coordinate value is contained in the read address codes.

If the result of the check is positive, the processing proceeds to next step 133 in which it is checked whether any of the codes I, J, and K that are radius information for specifying the center position is contained. Here, if any of the codes exits, it is judged as normal and the processing is ended. If none of the codes I, J, and K exits, there is a possibility that a radius is specified in order to specify the circular radius and the center direction, so that the processing proceeds to step 134 in which it is checked whether a code R exists. If the code R does not exist, the processing proceeds to step 135 in which the warning message a "REQUIRED DATA IS OMITTED" is written into the display I/F 29 and the warning issuance FG is set.

If the result of the judgment in step 132 is negative, there is a possibility that the command is a perfect circle command where the current position is set as the endpoint, so that the processing proceeds to step 138 in which it is checked whether any of the codes I, J, and K specifying the center position is contained and, if the result of this check is positive, it is regarded as normal and the processing is ended. On the other hand, if none of the codes I, J, and K exists, it is impossible to specify the center, so that the processing branches to step 135 in which warning processing is performed.

Step 136 and step 137 are the processing that is required for the batch check. In step 136, it is checked whether the batch check mode is selected and, if the batch check is not selected (if the sequential check is selected), the processing is ended. If the batch check is selected, the processing proceeds to step 137 in which the start/end address on the display memory of the block read in step 121 in FIG. 15 and a display mode, such as a display color, are set in the highlight information and the processing is ended.

Figure 17:
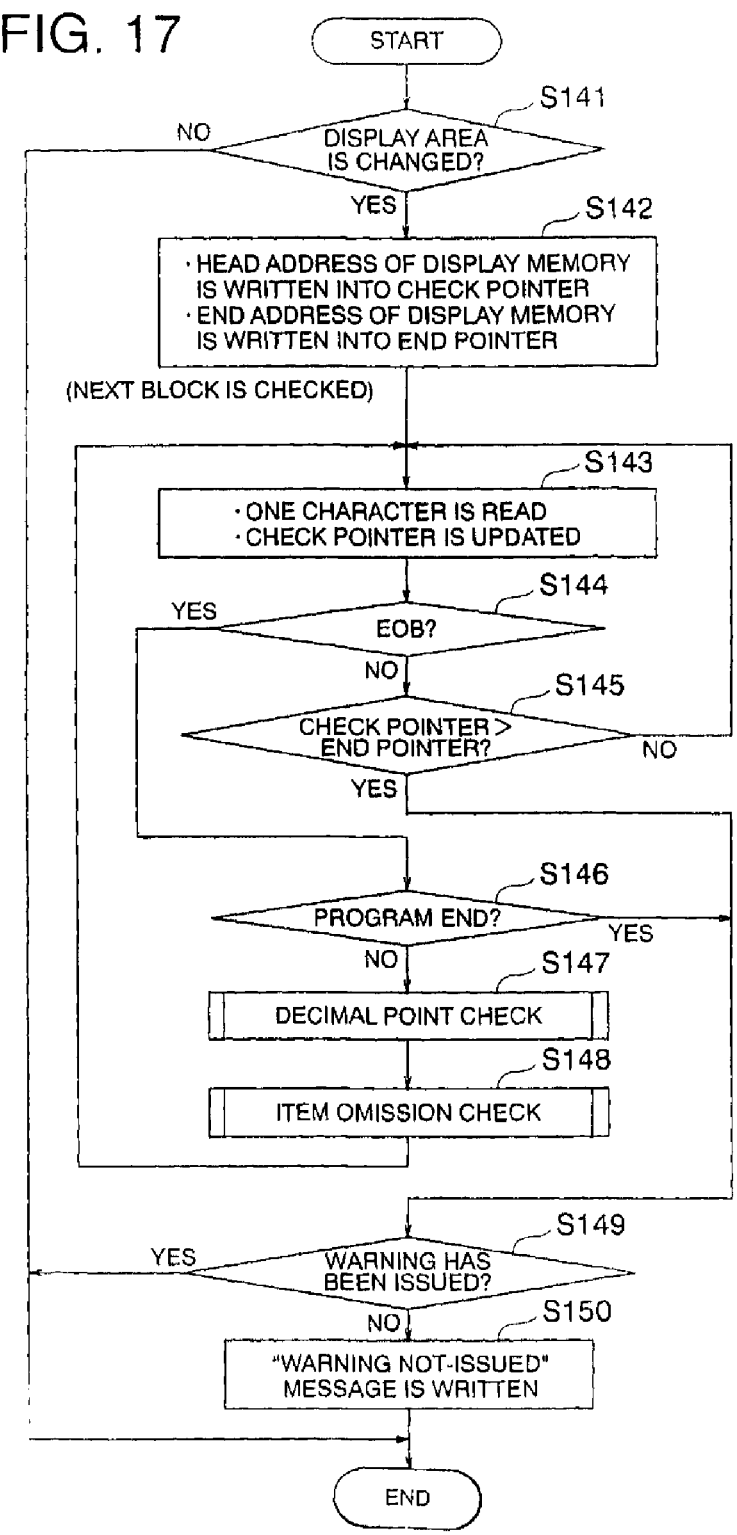
FIG. 17 is an input mistake warning re-execution processing flowchart according to the first embodiment of the present invention.

FIG. 17 is a flowchart for performing the decimal point check and the item omission check not in the sequential manner during the inputting of a program but in the batch manner after the completion of the inputting.

In step 141, it is checked whether the area of the memory displayed on the display screen of the setting display panel 7 is changed and, if the display screen is scrolled, the change in the display is detected and the processing proceeds to step 142. In step 142, the head address of the display memory is set in a check pointer and the end address of the display memory is set in an end pointer. Also, when a check is activated for the first time, this situation is also regarded as a display area change. In step 141, if no change is made to the display screen area, it is not required to repeat the same check in the same area, so that the processing is ended.

In step 143, data of one character is read from an address on the display memory specified by the check pointer and the contents of the check pointer are incremented by one (updated). The read character is stored in a predetermined area in the data memory 5 and is set as word data, and multiple pieces of word data are collected and set as data of one block (until an end of the block) In step 144, it is judged whether the read character is an end-of-block (EOB) and, if not, the processing proceeds to step 145 in which it is checked whether the display memory area is exceeded (check pointer>end pointer). If the display memory area is not exceeded, the processing returns to step 143 and the next character is read. If it is judged in step 145 that the display memory area is exceeded, there remains no data that should be checked, so that the processing branches to step 149 in which warning information processing is performed.

If it is judged in step 144 that the read character is an EOB, the processing proceeds to step 146 in which it is checked whether the read command block is the end of the program (M02 or M30). If the result of this check is positive, the processing branches to step 149 in which the warning information processing is performed. If it is judged in step 146 that the read command block is not the program end, the processing proceeds to step 147 in which the already-described decimal point check processing is performed. After that, the processing proceeds to step 148 in which the already-described item omission check processing is performed. Then, the processing returns to step 143 to perform a check of the next block.

Step 149 and step 150 are provided in order to perform post-processing when warnings were issued as a result of the decimal point check processing and the item omission check processing. In step 149, the warning issuance flag is checked, which is to be set if a warning is issued as a result of the decimal point check processing and the item omission check processing. If no warning was issued, the processing proceeds to step 150 in which a "WARNING NOT-ISSUED" message is written into the display I/F 29. If it is found in step 149 that the warning issuance flag is set, automatic displaying is performed based on a corresponding warning portion stored in the highlight display memory through the decimal point check processing and the item omission check processing. Therefore, the processing is ended.

It should be noted here that in the above description, as to the warning counter 49, a count value read from the history counter 50 is updated. Needless to say, however, a corresponding counter in the history counter 50 may be directly updated.

Further, the warning message is displayed on the display screen of the setting display panel 7. However, although the warning may be issued by a sound.

Further, a machining program generating apparatus incorporated into a numerical control apparatus has been described. However, the present invention may be applied to an independent machining program generating apparatus.

Further, it is of course possible to achieve the method of attaining the same actions and effects as in the embodiment described above even with a technique other than that described above.

INDUSTRIAL APPLICABILITY

As described above, the machining program generating apparatus according to the present invention is suitably used as a machining program generating apparatus for generating a machining program for numerical control.

What is claimed is:

1. A machining program generating apparatus for generating a machining program for numerical control, comprising:
    an input portion for inputting machining program data;
    a data display portion for displaying the data inputted from the input portion;
    a decimal point check target word storage portion for storing a decimal point check target word;
    a warning judgment value storage unit for storing a predetermined warning judgment value; and
    an input data check control portion for comparing the input data with the decimal point check target word and, if the input data is the decimal point check target word, comparing numerical value data of the input data with the warning judgment value and, if the numerical value data of the input data is larger or smaller than the warning judgment value, judging that there is a possibility that a decimal point position mistake may be made and issuing a warning.

2. A machining program generating apparatus according to claim 1, characterized in that the warning judgment value is a reference value for checking a value that makes the input data as an unnatural input value.

3. A machining program generating apparatus according to claim 1, characterized in that the input data check control portion performs the comparison each time a data input is performed.

4. A machining program generating apparatus according to claim 1, characterized in that
    the input data check control portion performs the comparison in a batch manner without performing analysis after the generation of the machining program through the inputting all of the data and before execution/analysis of the machining program.

5. A machining program generating apparatus according to claim 1, further comprising:
    a warning message storage portion for storing a warning message,
    the machining program generating apparatus being characterized in that the warning message stored in the warning message storage portion is displayed on the data display portion.

6. A machining program generating apparatus according to claim 1, further comprising:
    a history counter for, when warnings are detected as a result of the input data check, recording numbers of times of occurrence of the warnings in accordance with the contents of the warnings for each of at least one programming operation; and
    a caution message storage portion for storing caution messages,
    the machining program generating apparatus being characterized in that
    the caution messages for urging cautions in performing programming are displayed on the data display portion in a descending order of the numbers of times of occurrence of the warnings based on the contents lastly recorded in the history counter.

7. A machining program generating apparatus according to claim 1, further comprising:
    a history counter for, when warnings are detected as a result of the input data check, recording numbers of times of occurrence of the warnings in accordance with the contents of the warnings for each of at least one programming operation; and
    a history message storage portion for storing a history message,
    the machining program generating apparatus being characterized in that
    prior to programming, the numbers of times of occurrence of the warnings at the time of previous programming operations are graphically displayed on the data display portion in a time-series manner through analysis of the contents recorded in the history counter and the history message is also displayed.

8. A machining program generating apparatus for generating a machining program for numerical control, comprising:
    an input portion for inputting machining program data;
    a data display portion for displaying the data inputted from the input portion;
    a decimal point check target word storage portion for storing a decimal point check target word;
    a decimal point input specification storage portion for storing whether the apparatus adopts a specification where if the input data is not given a decimal point, the data is to be dealt with as data in a minimum command unit;
    a warning judgment value storage unit for storing a warning judgment value corresponding to the apparatus specification where if the input data is not given a decimal point, the data is to be dealt with as data in the minimum command unit and a warning judgment value under an apparatus specification where if the input data is not given a decimal point, the data is to be dealt with as data in a mm unit; and
    an input data check control portion for comparing the input data with the decimal point check target word and, if the input data is the decimal point check target word, comparing numerical value data of the input data with the warning judgment value corresponding to the specification and stored in the warning judgment value storage portion, and if the numerical value data of the input data is larger or smaller than the warning judgment value, issuing a warning.

9. A machining program generating apparatus according to claim 8, characterized in that the warning judgment value is a reference value for checking a value that makes the input data as an unnatural input value.

10. A machining program generating apparatus according to claim 8, characterized in that the input data check control portion performs the comparison each time a data input is performed.

11. A machining program generating apparatus according to claim 8, characterized in that
    the input data check control portion performs the comparison in a batch manner without performing analysis after the generation of the machining program through the inputting all of the data and before execution/analysis of the machining program.

12. A machining program generating apparatus according to claim 8, further comprising:
    a warning message storage portion for storing a warning message, the machining program generating apparatus being characterized in that the warning message stored in the warning message storage portion is displayed on the data display portion.

13. A machining program generating apparatus according to claim 8, further comprising:
- a history counter for, when warnings are detected as a result of the input data check, recording numbers of times of occurrence of the warnings in accordance with the contents of the warnings for each of at least one programming operation; and
- a caution message storage portion for storing caution messages,
- the machining program generating apparatus being characterized in that
- the caution messages for urging cautions in performing programming are displayed on the data display portion in a descending order of the numbers of times of occurrence of the warnings based on the contents lastly recorded in the history counter.

14. A machining program generating apparatus according to claim 8, further comprising:
- a history counter for, when warnings are detected as a result of the input data check, recording numbers of times of occurrence of the warnings in accordance with the contents of the warnings for each of at least one programming operation; and
- a history message storage portion for storing a history message,
- the machining program generating apparatus being characterized in that
- prior to programming, the numbers of times of occurrence of the warnings at the time of previous programming operations are graphically displayed on the data display portion in a time-series manner through analysis of the contents recorded in the history counter and the history message is also displayed.

\* \* \* \* \*

UNITED STATES PATENT AND TRADEMARK OFFICE
CERTIFICATE OF CORRECTION

| | | |
|---|---|---|
| PATENT NO. | : 6,970,764 B2 | |
| APPLICATION NO. | : 10/507777 | |
| DATED | : November 29, 2005 | |
| INVENTOR(S) | : Harada et al. | |

It is certified that error appears in the above-identified patent and that said Letters Patent is hereby corrected as shown below:

IN THE DRAWINGS

The drawing sheets 2, 15 and 17 consisting of Fig(s) 2, 15 and 17 should be deleted and substitute therefore the attached drawing sheets 2, 15 and 17 consisting of Fig(s) 2, 15 and 17.

Signed and Sealed this

Fifteenth Day of December, 2009

David J. Kappos
*Director of the United States Patent and Trademark Office*